(12) United States Patent
Suzuki et al.

(10) Patent No.: US 6,476,370 B1
(45) Date of Patent: Nov. 5, 2002

(54) METHOD OF CONTROLLING TURN-ON OF LIGHT SOURCE AND IMAGE FORMING APPARATUS

(75) Inventors: Takayoshi Suzuki, Ebina (JP); Kohei Shioya, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 187 days.

(21) Appl. No.: 09/696,949

(22) Filed: Oct. 27, 2000

(30) Foreign Application Priority Data

Dec. 15, 1999 (JP) .......................................... 11-356162

(51) Int. Cl.$^7$ .............................................. H01L 27/00

(52) U.S. Cl. .................... 250/208.1; 250/205; 347/236; 347/235

(58) Field of Search ............................ 250/208.1, 234, 250/235, 236, 205; 347/235, 236, 237, 250, 229; 359/216, 220

(56) References Cited

U.S. PATENT DOCUMENTS 6,208,449 B1 * 3/2001 Suzuki ........................ 347/235

FOREIGN PATENT DOCUMENTS

JP    11-268332    10/1999

* cited by examiner

Primary Examiner—Robert H. Kim
Assistant Examiner—Courtney Thomas
(74) Attorney, Agent, or Firm—Morgan, Lewis & Bockius LLP

(57) ABSTRACT

An image forming apparatus and a method of controlling turn-on of light source used therefor are capable of conducting stable image forming operation and maintaining high effective scanning rate while switching the rotation control of the polygonal motor between the internal control by the internal encoder of the motor and the external control by the horizontal synchronous signal outside of the motor. With the apparatus and method, the period of detecting the timing of start of the fast scanning (referred to as SOS period) is T when the driving motor rotates at a predetermined number of revolutions. T becomes shorter by T2 due to the switching from the internal control to the external control. During the shift from the internal control to the external control, the light source is turned on so that the period T1 from turning-on the light source for detecting the SOS timing to the detection of the SOS signal becomes longer than T2. Thereby, turning-on of the light source is surely conducted earlier than the SOS signal detection timing when the rotational control is switched from the internal control to the external control.

9 Claims, 14 Drawing Sheets

METHOD OF CONTROLLING TURN-ON OF LIGHT SOURCE AND IMAGE FORMING APPARATUS

BACKGROUND OF THE INVENTION

1. Field of the Invention

The present invention relates to a method of controlling turn-on of light source and an image forming apparatus, and particularly to a method of controlling turn-on of a light source for an image forming apparatus in which a laser beam emitted from the light source is scanned on an image carrier by rotating a rotational polygonal mirror to form an image on the image carrier, and an image forming apparatus using the control method.

2. Description of the Related Art

Image recording apparatuses for recording an image with a laser beam, such as a laser printer, an electrophotographic copying machine, etc. have propagated. In these image recording apparatuses, a scanning operation using a laser beam is carried out on a photosensitive medium by an optical scanning device.

In the optical scanning device, generally, a laser beam output from a semiconductor laser is modulated on the basis of image data, and then made incident through a collimator lens, etc. to a reflection surface of a rotational polygonal mirror (hereinafter referred to as "polygon mirror") rotating at a predetermined speed. By the rotation of the polygon mirror, the laser beam is deflected while the incidence angle of the laser beam is continuously varied, thereby performing a fast scanning operation on the photosensitive medium with the laser beam. The laser beam reflected from the reflection surface of the polygon mirror is guided through an fθ lens, a cylinder mirror (or cylinder lens) or the like to the photosensitive medium to scan the photosensitive medium at a constant speed and also to be focused onto the photosensitive medium, whereby an image is exposed and recorded on the photosensitive medium.

The optical scanning device is provided with a start-of-scan (SOS) sensor at the substantially equivalent position as the start-of-scan position of the photosensitive medium, and the laser beam at the start-of-scan position is guided to the start-of-scan sensor by a reflection mirror to obtain a start-of-scan (SOS) signal. An exposure recording (image writing) timing, a laser diode light amount control (APC: Auto Power Control) timing, etc. are determined on the basis of the start-of-scan signal.

Here, when the beam width of the scan direction of the laser beam incident on the polygon mirror is set to be sufficiently larger than the size of the reflection surface of the polygon mirror (in the case of a so-called over-field type optical scanning device), the scanning operation is carried out so that the laser beam incident on the polygonal mirror is cut out by the polygonal mirror, and thus the ratio of the width of an image area to the scan-permissible width that is, the effective scanning rate can be set to a sufficiently large value.

This enables the frequency of the video clock to be reduced when the same resolution is required to be obtained at the same process speed, and also the cost of ASIC of the image processing to be reduced. Further, the radiation noise and the heating can be reduced, so that the cost required for shield design, etc. can be reduced.

However, in the case of an image forming apparatus having a function of varying the magnification in the fast scanning direction of the image by varying the frequency of image clocks, there is a case where a sufficient processing time cannot be secured to perform processing such as light amount control processing for a laser diode or the like when an optical scanning device having a large effective scanning rate such as an over-field type is used.

Next, there will be described the output timing of each of an SOS signal, an image area signal (LS signal), an SOS pre-turn-on signal and an APC signal, that is, the output timing of each signal on the basis of the output timing of the SOS signal (i.e., the lapse time from the output time of the SOS signal to the output time of each signal) and the number of image clocks when the magnification in the fast scanning direction of the image is not changed (nominal state) are respectively set as shown in Table 1.

TABLE 1

|  | IMAGE AREA START | IMAGE AREA END | APC START | SOS PRE-TURN-ON START | SOS |
|---|---|---|---|---|---|
| LAPSE TIME FROM SOS SIGNAL (μs) | 10 | 330 | 335 | 345 | 350 |
| NUMBER OF IMAGE CLOCKS | 236 | 7795 | 7913 | 8149 | 8267.7 |

Table 1 relates to the case that the outputting timing of a next SOS signal on the basis of the detecting time of the SOS signal (i.e., the timing at which the next SOS signal is detected after the previous SOS signal is detected: SOS period) is set to 350 μs (microsecond).

Here, for example when the frequency of the image clocks is reduced by 2% in order to increase the magnification in the fast scanning direction of the image, the above values are set as shown in the following Table 2. Since the scanning speed is unvaried, the SOS period is kept to 350 μs.

TABLE 2

|  | IMAGE AREA START | IMAGE AREA END | APC START | SOS PRE-TURN-ON START | SOS |
|---|---|---|---|---|---|
| LAPSE TIME FROM SOS SIGNAL (μs) | 10.2 | 336.6 | 341.7 | 351.9 | 350 |
| NUMBER OF IMAGE CLOCKS | 236 | 7795 | 7913 | 8149 | 8102.3 |

According to this table, the output timing of the next SOS signal is set during the execution of the light amount control due to the output of the APS signal. Therefore, there may occur such a case that the light amount control of the laser beam is inaccurate or the detection of the laser beam by the SOS sensor cannot be accurately performed and thus no SOS signal is output.

Therefore, Japanese Laid-open Patent Application No. 268332/1999 discloses a technique of accurately performing the light amount control of the laser diode, etc. even when the frequency of the image clocks is made variable in order to vary the magnification in the fast scanning direction of the image.

This technique is characterized in that an image forming apparatus is provided with a controller for controlling the output timing of each of a turn-on indicating signal for indicating turn-on of a laser beam (SOS pre-turn-on signal)

and a light amount control indicating signal for indicating execution of light amount control of the laser beam (APC signal) so that these signals are generated at a fixed timing irrespective of the frequency of the image clocks.

More specifically, when the output finish timing of the LS signal exceeds the output start timing of the APC signal under the nominal state, the output start timing of the APC signal is altered just after the SOS signal is output, and also the output start timing of the SOS pre-turn-on signal is calculated on the basis of the following equation (1):

Timing after alteration=timing before alteration×(100−magnification to be varied)/100   (1)

Accordingly, the SOS pre-turn-on signal is output at a fixed timing at all times, and the detection of the laser beam by the SOS sensor can be accurately performed. For example, when the frequency of the image clocks is reduced from that under the nominal state of Table 1 by 2% in order to increase the magnification in the fast scanning direction of the image, the output timing of each signal is set as shown in the following Table 3.

TABLE 3

| | IMAGE AREA START | IMAGE AREA END | APC START | APC END | SOS PRE-TURN-ON START | SOS |
|---|---|---|---|---|---|---|
| LAPSE TIME FROM SOS SIGNAL (μs) | 10.2 | 336.6 | 0 | 10 | 344.9 | 350 |
| NUMBER OF IMAGE CLOCKS | 236 | 7795 | 0 | 231 | 7986 | 8102.3 |

As described above, even when the frequency of the image clocks is made variable in order to alter the magnification in the fast scanning direction of the image, the time required to perform the light amount control of the laser beam can be sufficiently secured, and the light amount control can be accurately performed. In addition, the timing of the SOS pre-turn-on signal can be sufficiently secured, and the detection of the laser beam by the SOS sensor can be accurately performed.

In connection with a recent coloring requirement, an image forming apparatus having a function of forming (printing) a color image has rapidly propagated. The formation of the color image can be implemented by superposing four colors of cyan (C), magenta (M), yellow (Y) serving as three primary colors and black (K) on a photosensitive drum. However, it needs a longer processing time than formation of a monochromatic (white and black) image, and has lower productivity. Therefore, there has been proposed a tandem type multi-color image forming apparatus which is equipped with a photosensitive drum and a light scanning device for each color of C, M, Y, K.

In the tandem type multi-color image forming apparatus, after a laser beam modulated on the basis of each color image data is generally output from the light scanning device of each corresponding color of C, M, Y, K to expose the corresponding photosensitive drum to the laser beam and form the corresponding latent image on the photosensitive drum, the respective latent images on the photosensitive drums are developed to form corresponding visible images on the photosensitive drums, and then the visible images are transferred onto the same recording medium while superposed on one another. That is, the respective images are formed at the same time, and thus the productivity can be greatly enhanced.

In the tandem type multi-color image forming apparatus, if the respective color images are subtly displaced in writing position from one another, it appears as color displacement when the respective images are superposed and then transferred onto a recording medium, resulting in reduction of the image quality of an image thus formed. In view of this problem, Japanese Patent Application No. 46468/1999 proposes a technique of correcting the color displacement in the slow scanning direction in the tandem type image forming apparatus.

More specifically, in the optical scanning device provided every color, a polygon motor for rotating a polygon mirror provided in the optical scanning device is subjected to PLL (phase locked loop) control, thereby rotating the polygon mirror at a fixed speed. More specifically, the comparison clock corresponding to the rotation speed of the motor concerned is obtained, and the PLL control is performed so that the comparison clock and the reference clock of a predetermined frequency are locked with keeping a predetermined phase difference.

At this time, in order to perform the image forming processing with high precision, the SOS signal is used as the comparison clock. However, in order to increase the lifetime of the laser diode and reduce the time required to start the polygon motor, a pulse signal (hereinafter referred to as "FG signal") synchronized with the rotational speed of the polygon motor from an FG sensor for detecting the number of revolutions of the polygon mirror is used as the comparison clock when the image forming processing is not carried out (on standby for the image forming processing), and it is changed the comparison clock to the SOS signal from the SOS sensor when the image forming processing is carried out.

When the color displacement occurs in the slow scanning direction, in order to correct the color displacement concerned, the frequency of the reference clock of a color for which an image writing position should be corrected (hereinafter referred to as "correction color") is changed, and it is returned to the original frequency after a predetermined time elapses. With this operation, the polygon motor for rotating the polygon mirror in the optical scanning device for the correction color is subjected to the PLL control on the basis of the frequency of the reference clock thus altered, thereby changing the rotational speed.

Thereafter, upon returning of the reference clock to the original frequency, the rotational speed is returned to the original rotational speed again. At this time, the rotational phase of the polygon mirror is varied by the amount corresponding to the variation of the frequency. Accordingly, the position of the slow scanning direction of the image of the correction color concerned can be relatively displaced by the phase difference in the slow scanning direction of the images of the other colors, thereby offsetting the color displacement from the images of the other colors.

However, in the case where the comparison clock is switched between the FG signal and the SOS signal in the PLL control operation of the polygon motor, although the polygon motor is rotated at a predetermined rotational speed (at a predetermined number of revolutions) when the switching operation is carried out, it may be judged that the number of revolutions is not the predetermined number of revolutions if there is a phase difference between these two signals. By the action of the PLL control, the rotational speed of the polygon motor is varied in accordance with the phase difference between the FG signal and the SOS signal at this time (the number of revolutions is varied).

For example, if the comparison clock is switched from the FG clock to the SOS signal at a timing indicated by an arrow A when the FG signal and the SOS signal have the same frequency and the same duty as shown in FIG. 11, the period of the comparison clock is instantaneously lengthened. Therefore, it is judged in the PLL control that the number of revolutions of the polygon motor is reduced, and thus the speed of the polygon motor is increased. Through this control, the number of revolutions of the polygon motor is varied as shown in FIG. 12. Due to the variation of the rotation, the detection timing of SOS is earlier than the turn-on (SOS pre-turn-on) for detecting the SOS signal, and thus there may occur such a case that the SOS signal is missing.

Further, when a monolithic type laser diode having plural light emission points is used, each of the plural light emission points must be independently turned on to perform the light amount control because only one photodiode (PD) for detecting the output light amount is provided. That is, any one of the light emission points is turned on during the APC period. On the other hand, it is necessary to turn on the plural light emission points at the same time in order to detect the SOS signal, and thus no SOS signal may be detected due to an insufficient light amount when the detection timing of the SOS signal and the APC period are overlapped with each other.

Here, a case where a monolithic type laser diode having two light emission points is used will be described in detail.

FIG. 13 is a timing chart for each signal when the light amount control and the SOS pre-turn-on under the nominal state shown in Table 1 are carried out. In FIG. 13, "SOS" represents the detection timing of the SOS signal, "APC-A" represents an APC signal which instructs execution of the light amount control of one light emission point, "APC-B" represents an APC signal which instructs execution of the light amount control of the other light emission point, "VDATA-A" represents a turn-on signal which instructs turn-on of one light emission point, "VDATA-B" represents a turn-on signal which instructs turn-on of the other light emission point, and "emission light amount" represents the emission light amount from the laser diode (the total emission light amount from the two light emission points).

As shown in FIG. 13, during the APC period, the APC signal of the one light emission point is set to H (High) level (see APC-A), and the APC signal of the other light emission point is set to L (Low) level (see APC-B), and the light amount control (APC) is carried out by turning on the one light emission point (see VDATA-A) and turning out the other light emission point (see VDATA-B). On the other hand, during the turn-on period (SOS pre-turn-on) for detecting the SOS signal, both the light emission points are turned on (see VDATA-A, VDATA-B).

When the polygon motor is increased in speed by switching the comparison clock from the FG clock to the SOS signal or the like under the control as shown in FIG. 13, the period of the detecting timing of the SOS signal (hereinafter referred to as "SOS period") is shortened. FIG. 14 is a timing chart for each signal when the number of revolutions of the polygon motor is varied by about 1.5%.

As shown in FIG. 14, when the number of revolutions of the polygon motor is varied by about 1.5%, the SOS period which is equal to 350 μs in FIG. 13 is reduced by 5.25 μs (35 μs×0.015) and thus equal to 344.5 μs. Therefore, the SOS detection timing is earlier than the SOS pre-turn-on start timing, and overlapped with the APC period. That is, the state that only one light emission point is turned on is kept irrespective of incoming of the SOS detection timing.

Accordingly, the amount of light incident on the SOS sensor is smaller than the light amount required to detect the SOS signal, and thus no SOS signal is generated. That is, if the rotational variation exceeds about 1.5%, the omission of the SOS signal occurs.

When the omission of the SOS signal occurs as described above, under the PLL control it is judged that the number of revolutions of the polygon motor is lowered, and the control is carried out so that the speed of the polygon motor is increased, resulting in inducing runaway of the polygon motor. Due to the runaway of the polygon motor, the operation of the image forming apparatus is stopped to reduce the productive efficiency of the apparatus.

SUMMARY OF THE INVENTION

The present invention has been implemented under these circumstances, and provides a method of controlling turn-on of a light source which enables a stable image forming operation and enables an effective scanning rate to be kept high even when the control of the rotation of a polygon motor is switched between the internal control based on an encoder in the motor and the external control based on a horizontal synchronous signal from the outside of the motor, and an image forming apparatus using the control method.

According to an aspect of the present invention, a light source turn-on control method used for an image forming apparatus in which a laser beam output from a light source scans an image carrier by rotating a rotational polygonal mirror and which has a function of switching a control operation between an internal control operation of detecting the number of revolutions of a driving motor for rotating the rotational polygonal mirror and rotating the driving motor at a predetermined number of revolutions on the basis of the detection result and an external control operation of detecting a fast scanning timing of the laser beam by a fast scanning timing detection unit disposed out of an image forming area in a fast scanning direction of the laser beam and rotating the driving motor at a predetermined number of revolutions on the basis of the detection result, is characterized in that when T1 represents the period from a start time at which turn-on of the light source is started to make the laser beam incident on the fast scanning timing detection unit a time at which the laser beam is incident on the fast scanning timing detection unit and the fast scanning timing is detected and T2 represents the time corresponding to a variation of one fast scanning time due to a rotational variation of the driving motor which is caused by the switching operation from the internal control to the external control, the turn-on of the light source to make the laser beam incident on the fast scanning timing detection unit is started so as to satisfy the relationship of T1>T2 during the shift period of the switching operation from the internal control to the external control.

According to the present invention, the driving motor for rotating the rotational polygonal mirror is controlled so as to rotate at a predetermined number of revolutions (rotational speed). The control of the driving motor can be switched between the internal control based on the detection result of the number of revolutions of the driving motor and the external control based on the detection result of the fast scanning timing of the laser beam by the fast scanning timing detection unit. In order to perform the external control, it is necessarily required to turn on the light source in order to make the laser beam incident on the fast scanning timing detection unit.

Here, the turn-on starting timing to make the laser beam incident on the fast scanning timing detection unit (to detect the fast scanning timing) is set so that during the shift period of the switching operation from the internal control to the external control, the time (T1) corresponding to the period from the time at which the turn-on operation is started to make the laser beam incident on the fast scanning timing detection unit until the time at which the fast scanning timing is detected is longer than the time (T2) corresponding to the variation of the one fast scanning time due to the rotational variation of the driving motor which is caused by the switching operation (T1>T2).

Accordingly, even when the number of revolutions of the driving motor is varied due to the switching operation from the internal control to the external control, the laser beam can be made incident on the fast scanning timing detection unit. That is, the fast scanning timing can be surely detected, and thus the number of revolutions of the driving motor can be returned to a desired number of revolutions and the runaway of the driving motor can be prevented.

According to another aspect of the present invention of the present invention, in the light source turn-on control method of the present invention, when T3 represents the period from the end portion of the image forming area until the detection of the fast scanning timing by the fast scanning timing detection unit, after the shift to the external control, the turn-on start timing of the light source to make the laser beam incident on the fast scanning timing detection unit may be varied so as to satisfy the relationship of T1<T3.

According to another aspect of the present invention, in the light source turn-on control method of the present invention, when T3 represents the period from the end portion of the image forming area until the detection of the fast scanning timing by the fast scanning timing detection unit and T4 represents the period for which the light source is turned on for the light amount control which controls the light amount of the laser beam output from the light source, after the shift to the external control, the turn-on start timing of the light source to make the laser beam incident on the fast scanning timing detection unit may be varied so as to satisfy the relationship of T1<(T3−T4).

According to another aspect of the present invention, an image forming apparatus in which a laser beam output from a light source scans an image carrier by rotating a rotational polygonal mirror to form an image, is characterized by comprising: a number of revolutions detecting unit for detecting the number of revolutions of a driving motor which rotates the rotational polygonal mirror; an internal control unit for rotating the driving motor at a desired number of revolutions on the basis of the detection result of the number of revolutions detecting unit; a fast scanning timing detection unit which is provided out of an image forming area in the fast scanning direction of the laser beam and detects a fast scanning timing of the laser beam; an external control unit for rotating the driving motor at a desired number of revolutions on the basis of the detection result by the fast scanning timing detection unit; a switching control unit for performing a switching operation between a rotational control based on the internal control unit and a rotational control based on the external control unit; and a turn-on control unit for turning on the light source earlier than a timing of incidence of the laser beam on the fast scanning timing detection unit by at least the time corresponding to a variation of one fast scanning time due to the rotational variation of the driving motor caused by the switching operation during a shift period for which the rotational control based on the internal control unit is switched to the rotational control based on the external control unit by the switching control unit.

In the light source turn-on control apparatus of the present invention, the rotation of the driving motor is controlled while switching the rotational control thereof between the rotational control based on the internal control unit (hereinafter referred to as "internal control") and the rotational control based on the external control unit (hereinafter referred to as "external control", thereby rotating the driving motor at a desired number of revolutions (rotational speed). The internal control unit controls the rotation of the driving motor on the basis of the detection result of the number of revolutions detecting unit for detecting the number of revolutions of the driving motor. The external control unit controls the rotation of the driving motor on the basis of the detection result of the fast scanning timing of the laser beam by the fast scanning timing detection unit.

The turn-on control unit turns on the light source earlier than the incident timing of the laser beam during the shift period to the fast scanning timing detection unit by at least the time corresponding to the variation of one fast scanning time due to the rotational variation of the driving motor which is caused by the switching operation.

Accordingly, even when the number of revolutions of the driving motor is varied due to the switching operation from the internal control to the external control, the laser beam can be incident on the fast scanning timing detection unit. That is, the fast scanning timing can be surely detected, and thus the number of revolutions of the driving motor can be returned to a predetermined number of revolutions, thereby preventing the runaway of the driving motor.

According to another aspect of the present invention, the light source turn-on control apparatus of the present invention is further equipped with a light amount control unit for controlling the light amount of the laser beam output from the light source. After the shift to the rotational control based on the external control unit, the turn-on control unit turns on the light source out of the image forming area and before the irradiation position of the laser beam reaches the fast scanning timing detection unit, and for the light amount control based on the light amount control unit, the turn-on control unit turns on the light source out of the image forming area and during a period which is different from the turn-onon started before the irradiation position of the laser beam reaches the fast scanning timing detection unit.

According to another aspect of the present invention, in the light source turn-on control apparatus of the present invention, the light source has plural light emission points, the turn-on control unit independently turns on each of the plural light emission points, and the light amount control unit controls the light amount of the laser beam output from the light emission point concerned every light emission point.

According to another aspect of the present invention, the light source turn-on on control apparatus of the present invention is further equipped with an abnormality detecting unit for detecting rotational abnormality of the driving motor on the basis of the detection result of the number of revolutions detecting unit or the fast scanning timing detecting unit, and a ceasing unit for ceasing the detection of the rotation abnormality of the driving motor by the abnormality detecting unit during the period from the time at which the rotational control is switched from the rotational control based on the internal control unit to the rotational control based on the external control unit until the time at which the number of revolutions of the driving motor is within a predetermined range.

According to another aspect of the present invention, in the light source turn-on control apparatus of the present invention, when the rotation abnormality of the driving motor is detected by the abnormality detecting unit under the rotational control based on the external control unit, the rotational control based on the external control unit is switched to the rotational control based on the internal control unit.

BRIEF DESCRIPTION OF THE DRAWINGS

Preferred embodiments of the present invention will be described in detail based on the following figures, wherein:

FIGS. 1A to 1F are timing charts showing the principle of the present invention, wherein FIGS. 1A and 1B show the detection results (SOS signal) of a scanning start timing, and FIGS. 1C to 1F show the output timing of a turn-on signal which instructs to turn on a light source;

DETAILED DESCRIPTION OF THE PREFERRED EMBODIMENTS

Preferred embodiments according to the present invention will be described hereunder with reference to the accompanying drawings.

Before the embodiments are described, explanation about detection of the start of fast scanning is given with reference to FIGS. 1A to 1F.

FIGS. 1A to 1F are timing charts showing the detection result of the start-of-scanning timing (SOS signal) and a turn-on signal for instructing the turn-on of the light source when an SOS sensor for detecting the start-of-scanning timing (SOS) is used as the fast scanning timing detection unit.

Figure 1:
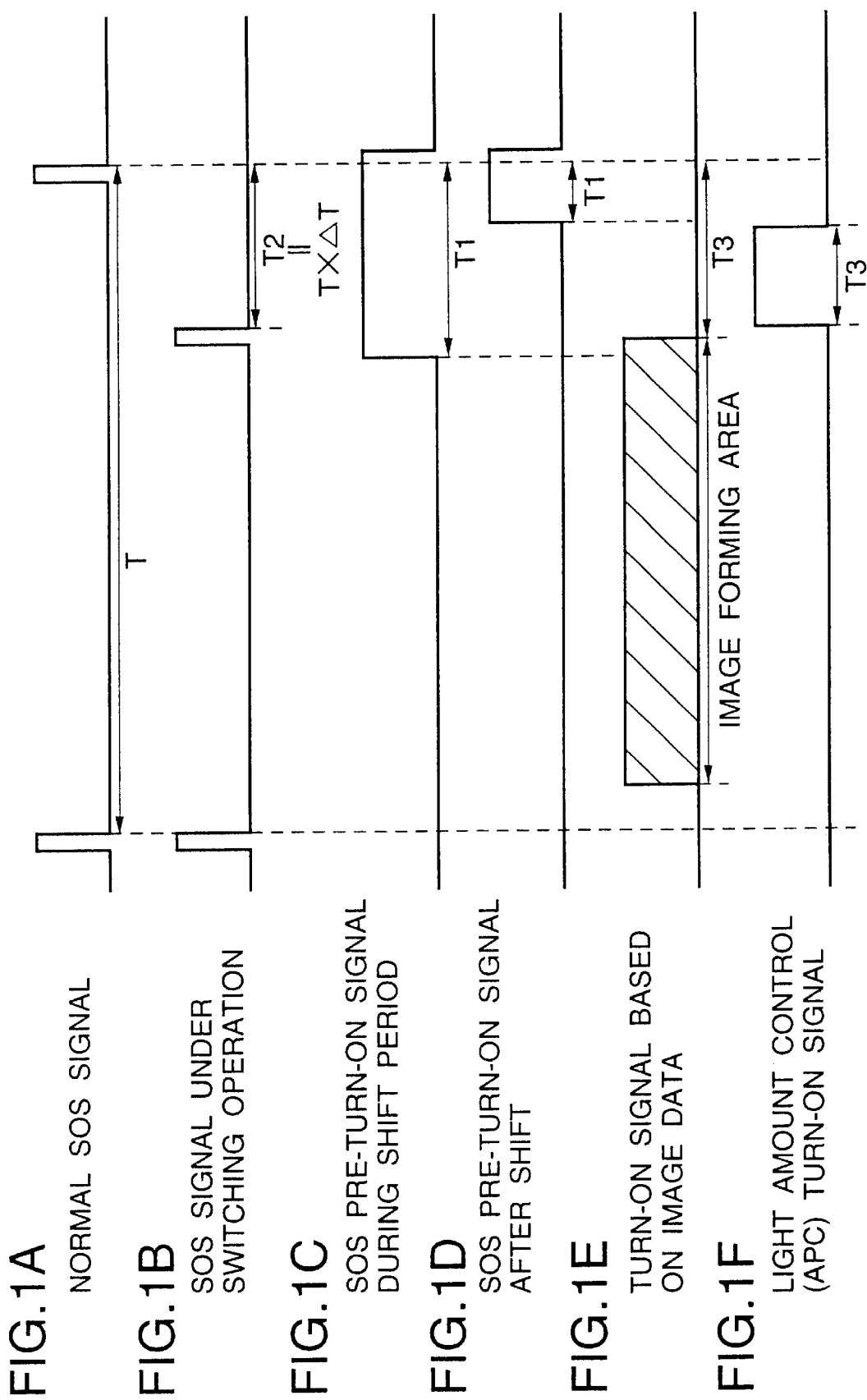

There will be hereunder described such a case that the detection period of the fast scanning start timing (hereinafter referred to as "SOS period") when the driving motor is rotated at a prescribed number of revolutions is represented by T as shown in FIG. 1A and the SOS period is shortened by T2 due to the switching operation from the internal control to the external control as shown in FIG. 1B. T2 may be calculated from the calculation of T2=T×ΔT, wherein ΔT represents the coefficient of variation of the rotation of the driving motor.

During the shift period from the internal control to the external control, the light source is turned on so that the period (SOS pre-turn-on period) T1 from the turn-on starting time for the detection of the fast scanning timing until the SOS signal detection time is longer than T2, whereby as shown in FIG. 1C, the turn-on (SOS pre-turn-on) of the light source to detect the SOS signal is started earlier than the SOS signal detection timing (see FIG. 1B) when the internal control is switched to the external control.

Accordingly, even when the control is switched from the internal control to the external control, the SOS signal can be surely detected (the SOS signal omission can be prevented) and the runaway of the driving motor can be prevented, so that the image forming processing can be stably performed without stopping the operation of the apparatus.

The rotational variation of the driving motor due to the switching operation from the internal control to the external control is converged within a short time of about one second. Therefore, after the convergence, T1 is shortened as shown in FIG. 1D and the start timing of the SOS pre-turn-on may be varied so that the SOS pre-turn-on on period is converged within the period T3 from the end portion of an image forming area shown in FIG. 1E until the detection of the SOS signal (T1<T3). Accordingly, even when the period of the SOS pre-turn-on during the shift period is overlapped with the image forming area, the SOS pre-turn-on can be set to be out of the image forming area in a short time, and thus it has little effect on the start timing of the image forming processing.

Further, when the light amount control of the laser beam is carried out, the start timing of the SOS pre-turn-on is varied so that the SOS pre-turn-on period is converged within the period obtained by subtracting the turn-on (APC turn-on) period T4 of the light source from the period T3 from the end portion of the image forming area after the rotational variation of the driving motor is converged until the SOS signal detection (T1<(T3−T4)). Accordingly, even when the SOS pre-turn-on period during the shift period is overlapped with the image forming area, the SOS pre-turn-on can be set to be out of the image area in a short time. Further, a time required for not only the SOS pre-turn-on, but also the light amount control can be secured.

<First Embodiment>

Figure 2:
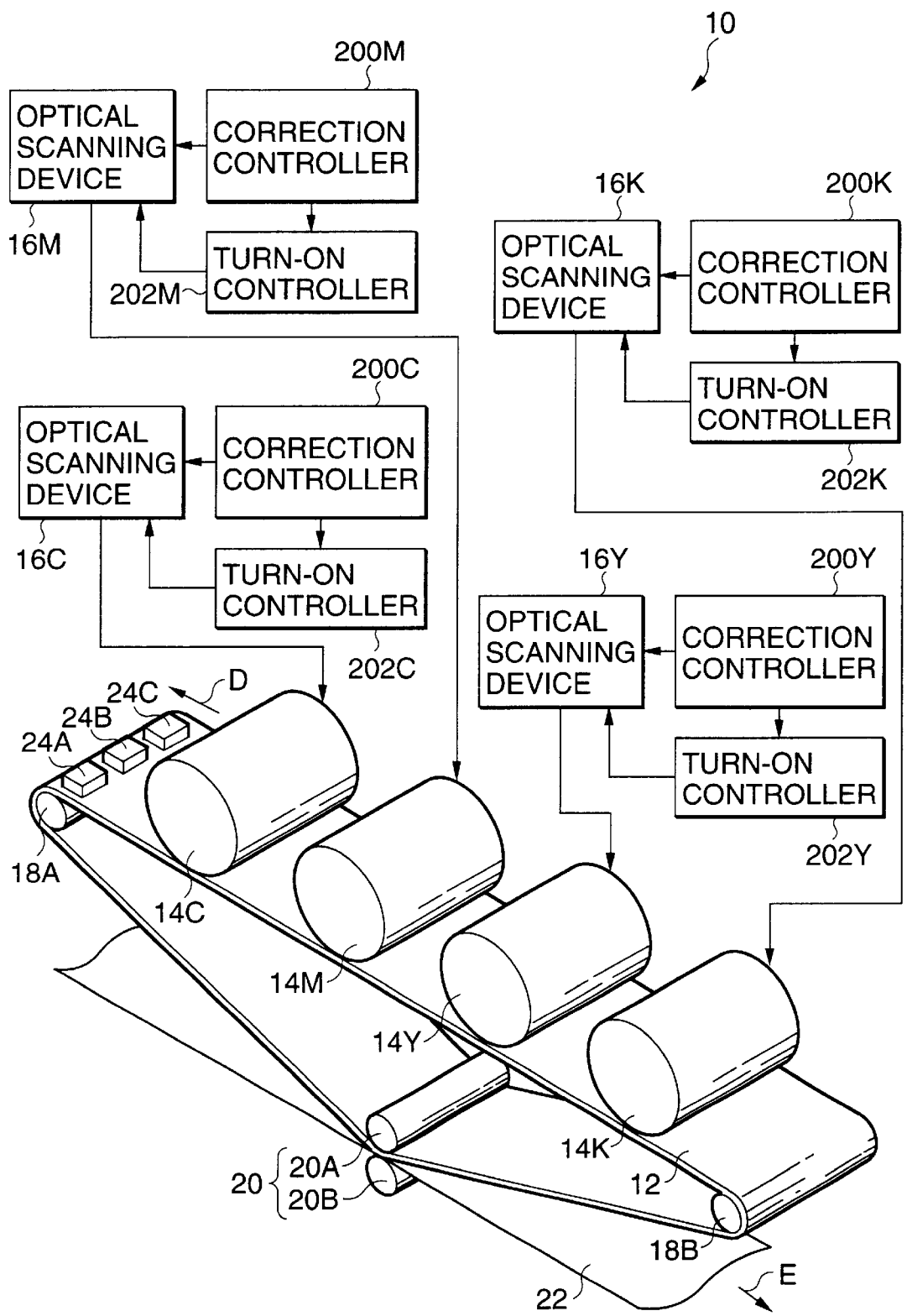
FIG. 2 is a diagram showing the construction of an image forming apparatus according to an embodiment of the present invention.

FIG. 2 schematically shows the construction of an image forming apparatus according to a first embodiment of the present invention.

As shown in FIG. 2, plural drum-shaped photosensitive members 14 are disposed along the longitudinal direction of a transfer belt 12 in the image forming apparatus 10. The image forming apparatus 10 according to this embodiment contains four photosensitive members (photosensitive drums) 14 corresponding to four colors of cyan (C), magenta (M), yellow (Y), black (K) because it targets a color image. For those members disposed in connection with the respective colors (for example, the photosensitive members, the optical scanning devices, etc.), these members will be described while alphabets of C, M, Y, K are a fixed to the ends of the reference numerals if these members are required to be described separately from one another.

A charger, a developer, a first transfer unit, a cleaner, etc. (not shown) are disposed around each of the photosensitive members 14, and an optical scanning device 16 (described in more detail later) for irradiating to the photosensitive member 14 a laser beam modulated on the basis of a target image is also disposed around each photosensitive member 14. The laser beam is irradiated from the optical scanning device 16 onto the photosensitive member 14 which is uniformly charged by the charger, whereby the latent image corresponding to the target image is formed on the surface of the photosensitive member 14.

The latent image formed on the surface of the photosensitive member 14 is developed with each toner by the developer disposed around the photosensitive member 14. That is, a toner image is formed on the surface of the photosensitive member 14. Cyan, magenta, yellow and black toner materials for the photosensitive members 14C, 14M, 14Y and 14K are filled in the respective developers.

The toner image formed on the surface of the photosensitive member 14 is transferred onto the transfer belt 12 by the first transfer unit. The transfer belt 12 is rotatable in a predetermined direction (the direction indicated by an arrow D shown in FIG. 2) by feeding rollers 18A, 18B and one roller 20A constituting a second transfer unit 20. The toner images formed on the surfaces of the photosensitive members 14C, 14M and 14K are successively transferred onto the transfer belt 12. That is, the four color toner images of cyan, magenta, yellow and black are transferred on the transfer belt 12 with being superposed on the transfer belt 12. In this embodiment, a toner image obtained by superposing these four color toner images is referred to as "final toner image".

Toner remaining on the surface of the photosensitive member 14 when the transfer of the toner image onto the transfer belt 12 is completed is removed by the cleaner (not shown), and then the photosensitive member 14 is discharged by a discharging lamp.

A second transfer unit 20 is disposed so as to confront the photosensitive member 14 through the transfer belt 12. The second transfer unit 20 is constructed by two confronting rollers 20A, 20B, and it transfers the final toner image on the transfer belt 12 onto a sheet 22 which is discharged from a sheet tray (not shown) and fed in the direction indicated by an arrow E of FIG. 2. The sheet 22 having the final toner image transferred thereto is fixed by a fixer (not shown), thereby forming a desired image on the sheet 22.

Further, image position detecting sensors 24A, 24B, 24C are disposed along the width direction of the transfer belt 12 at the downstream side of the photosensitive members 14 in the feeding direction of the transfer belt 12. The area in the width direction of the transfer belt 12 corresponds to an image scan-permissible area in the photosensitive member 14. The image position detection sensors 24A, 24B, 24C detect the position of the final toner image transferred onto the transfer belt 12. The position detection result of the final toner image is used for color displacement correction of a correction controller 200 described later.

(Construction of Optical Scanning Device)

Figure 3:
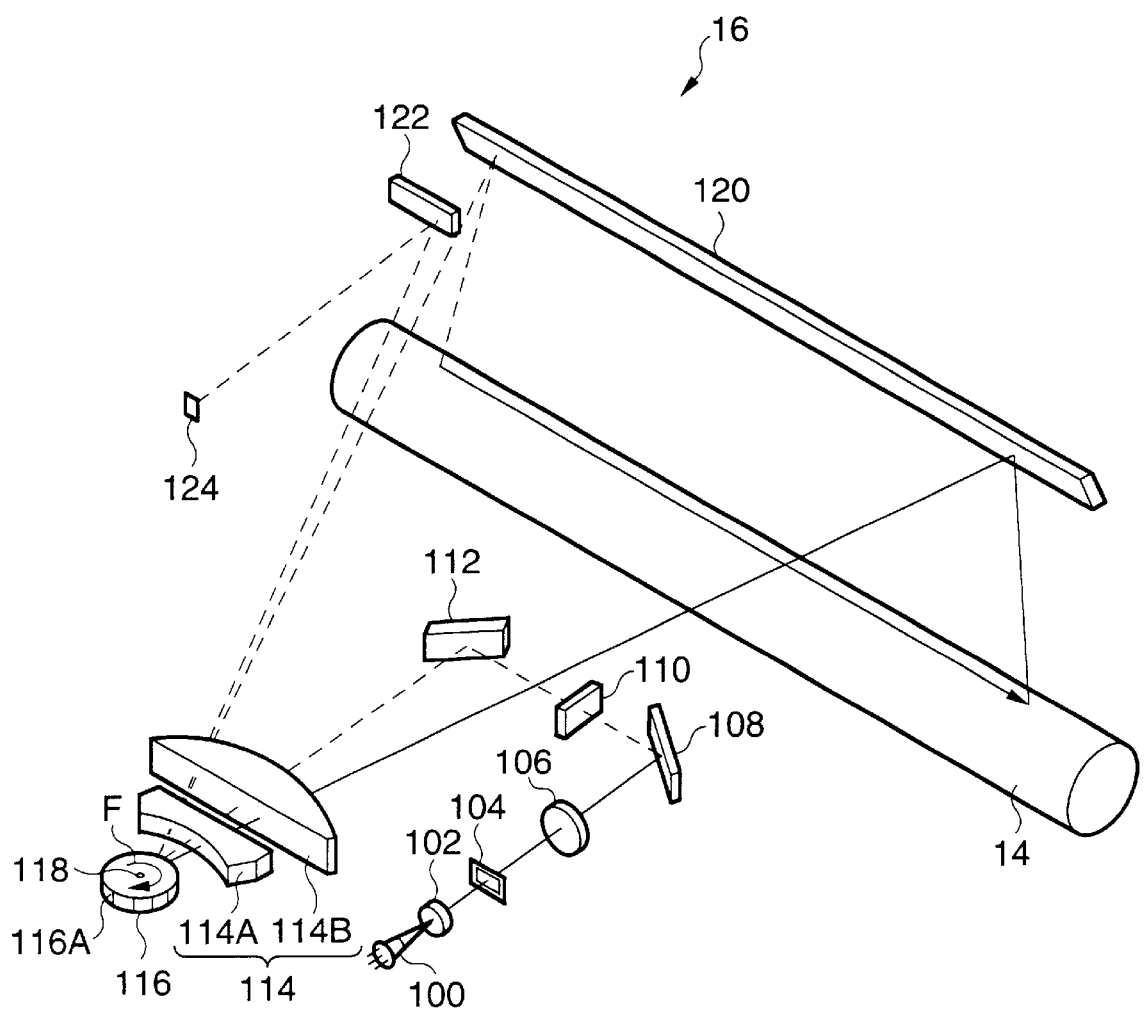
FIG. 3 is a detailed diagram of an optical scanning device.

As shown in FIG. 3, each optical scanning device 16 is equipped with a laser diode (hereinafter referred to as "LD") 100 as a light source, and a rotational polygonal mirror (hereinafter referred to as "polygon mirror") 116 for reflecting a laser beam emitted from LD 100 to irradiate a laser beam to each corresponding photosensitive member 14. LD 100 may have a single light emission point or plural light emission points. In this embodiment, a monolithic type LD having plural (two) light emission points and a photodiode (PD) for detecting the output light amount is used.

The driving of LD 100, that is, the laser beam emission of LD 100 is controlled by a turn-on controller 202 (described in more detail later). A collimator lens 102 and a slit 104 are disposed in this order at the downstream side in the travel direction of the laser beam emitted from LD 100. The laser beam emitted from LD 100 is converted from a diffused light beam to a collimated light beam by the collimator lens 102, and shaped by a slit 104. The laser beam passed through the slit 104 is incident on a polygon mirror 116 through an fθ lens 114 (which is constructed by an expander lens 106, a reflection mirror 108, a cylinder lens 110, a reflection mirror 112, a first lens 114A and a second lens 114B in this order).

The polygon mirror 116 is designed as a regular polygonal shape (dodecagonal shape in this embodiment) having plural reflection faces 116A on the side surfaces thereof, and the incident laser beam is converged to the reflection faces 116A. The polygon mirror 116 is secured to the shaft of a polygon motor 150 (see FIG. 4, described later) which is controlled to rotate at a predetermined speed, and it is rotated around the rotational shaft 118 at a predetermined speed in the direction indicated by an arrow F through the rotation of the polygon motor 150. The polygon motor 150 corresponds to the driving motor of the present invention.

By the rotation of the polygon mirror 116 due to the rotation of the polygon motor 150, the incident angle of the laser beam to each reflection face 116A is continuously varied and thus the incident laser beam is deflected, whereby the laser beam is irradiated to the photosensitive member 14 while it scans the photosensitive drum 14 in the axial line direction thereof.

The beam width in the scan direction of the laser beam incident on the polygon mirror 116 is set to be sufficiently larger than the size of the reflection face 116A (so-called over-field type), and the polygon mirror 116 is scanned so as to cut out the laser beam incident thereto.

The laser beam reflected from the polygon mirror 116 is passed through the fθ lens 114 again, reflected from a cylinder mirror 120 and guided to the photosensitive member 14. The scan speed of the laser beam reflected from the polygon mirror 116 when the laser beam is irradiated onto the photosensitive member 14 is converted to a fixed speed, and the laser beam is focused onto the peripheral surface of the photosensitive member 14 in the fast scanning direction by the fθ lens 114. Further, it is focused onto the peripheral surface of the photosensitive member 14 in the slow scanning direction.

A reflection mirror 122 is disposed on the passage of the laser beam which travels to the scan start position of the photosensitive member 14. The laser beam travelling to the scan start position of the photosensitive member 14 is reflected by the reflection mirror 122.

An SOS sensor 124 which is constructed by an optical detection sensor such as a photodiode or the like is disposed in the reflection direction of the laser beam by the reflection mirror 122 and at the substantially equivalent position as the photosensitive member 14 with respect to the reflection mirror 122. The laser beam travelling to the scan start position is incident on the SOS sensor 124 while the laser beam scans the photosensitive member 14 in the axial direction thereof.

That is, with the SOS sensor 124, the scan start timing at which the photosensitive member 14 is scanned with the laser beam can be detected. An SOS signal indicating the scan start timing thus detected is output from the SOS sensor 124. The SOS sensor 124 corresponds to the fast scanning timing detection unit of the present invention.

The SOS signal is used for the driving control of the polygon motor 150, etc.

Next, the driving control of the polygon motor 150 will be described hereunder.

Figure 4:
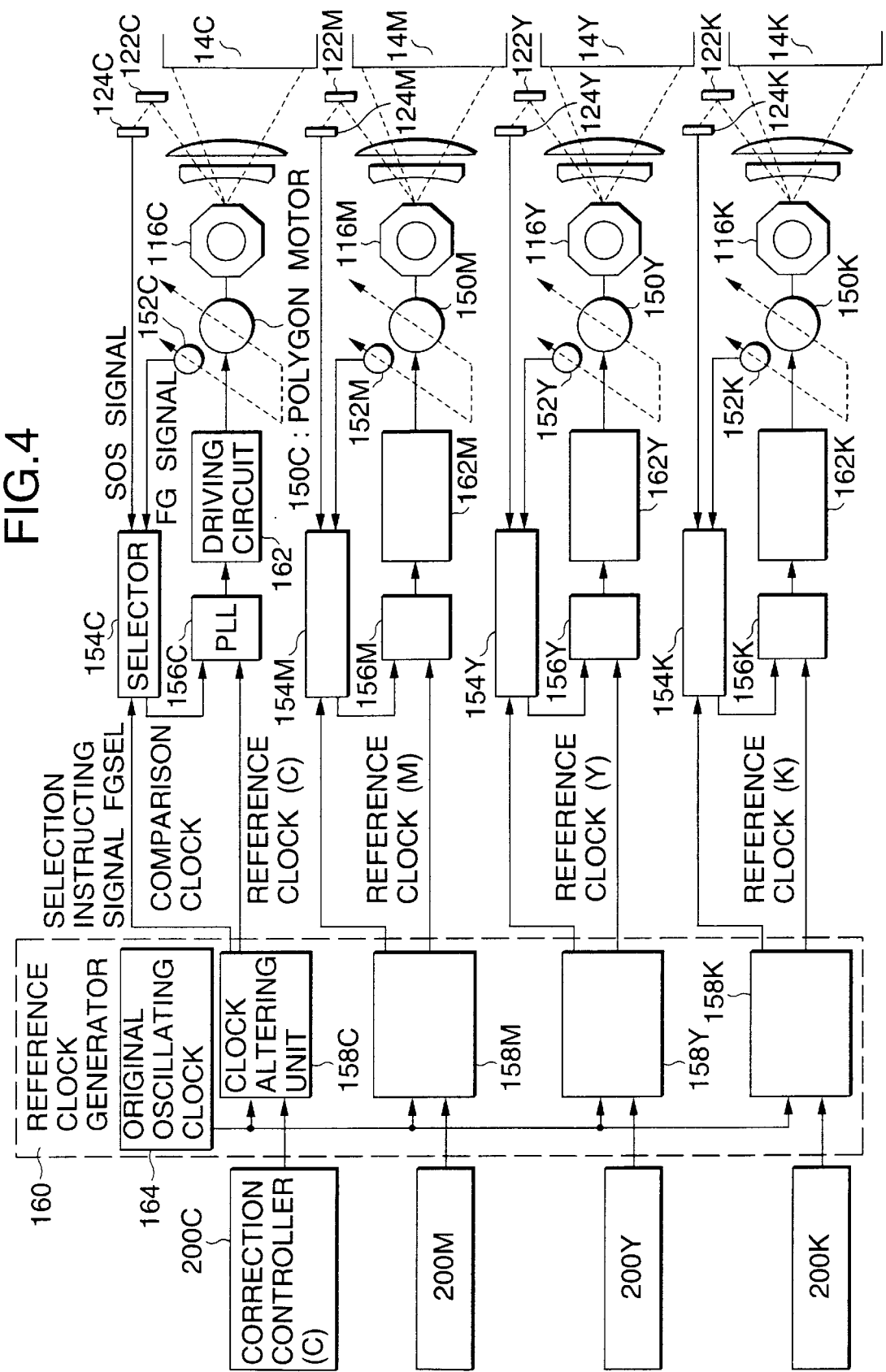
FIG. 4 is a block diagram showing the control of a polygon motor.

FIG. 4 is a block diagram showing the control of the polygon motor.

An FG sensor 152 for detecting the number of revolutions of the polygon motor is secured to the polygon motor 150 to generate a pulse signal (FG signal) which is synchronous with the rotational speed of the polygon motor 150. That is, the FG sensor 152 corresponds to the number of revolutions detection unit of the present invention.

The FG signal generated by the FG sensor 152 is input to a selector 154. The SOS signal output from the SOS sensor 124 is also input to the selector 154.

The selector 154 is connected to a PLL control circuit 156 and selectively transmits the FG signal or the SOS signal as the comparison clock to the PLL control circuit 156. Upon an instruction of CPU 206 (see FIG. 5), the selection of the FG signal/SOS signal by the selector 154 is carried out on the basis of a selection instructing signal FGSEL input from a correction controller 200 (described later) through a clock altering unit 158. That is, in the selector 154, the FG signal is selected when the selection instructing signal FGSEL is set to H (High) level, and the SOS signal is selected when the selection instructing signal FGSEL is set to L (Low) level.

Specifically, before an instruction of executing the image forming processing is input, that is, before the image forming apparatus is set to an image forming state, the selector 154 is controlled to select the FG signal as the comparison clock and transmit it to the PLL control circuit 156. When the instruction of executing the image forming processing is input, that is, the image forming apparatus is shifted to the image forming state, the SOS signal is selected as the comparison clock and transmitted to the PLL control circuit 156. The PLL control circuit 156 corresponds to the internal control unit and the external control unit of the present invention.

The PLL control circuit 156 is connected to a reference clock generator 160, and is supplied with a reference clock generated in the reference clock generator 160. The PLL control circuit 156 outputs a speed control signal for controlling the driving speed of the polygon motor 150 so that the reference clock and the comparison clock input thereto are kept to be phase-locked with a predetermined phase difference.

The speed control signal output from the PLL control circuit 156 is input to a motor driving circuit 162 for controlling the driving of the polygon motor 150. The motor driving circuit 162 controls the driving of the polygon motor 150 on the basis of the speed control signal input thereto, whereby the polygon motor 150 is controlled at a proper rotational speed and in proper phase.

That is, when the image forming apparatus is not set to the image forming state, the polygon mirror 116 is rotated at a fixed speed with high precision through the PLL control based on the comparison between the reference clock supplied from the reference clock generator 160 and the FG signal from the FG sensor 152 (corresponding to the internal control of the present invention). When the image forming apparatus is set to the image forming state, the polygon mirror 116 is rotated at a fixed speed with high precision through the PLL control based on the comparison between the reference clock supplied from the reference clock generator 160 and the SOS signal from the SOS sensor 124 (external control).

As described above, when the image forming apparatus is out of the image forming state, the polygon motor 150 can be rotated at a fixed speed without turning on LD 100 by performing the rotational control based on the FG signal from the FG sensor 152, that is, the internal encoder of the polygonal motor 150 (internal control), whereby the lifetime of LD 100 can be increased and the time required to start the polygon motor 150 (the time required to shift to the image forming state) can be reduced.

Here, the reference clock generator 160 outputs a clock signal of a predetermined frequency fO generated in an original oscillating clock 164 as a reference clock signal through the clock altering unit 158 to the PLL control circuit 156. The original oscillating clock 164 is commonly provided to the respective polygon motors 150 (common to the respective colors), and the clock altering unit 158 is provided every polygon motor 150 (every color).

In each clock altering unit 158, the frequency of the reference clock can be temporarily altered from f0 to f1. The alteration of the frequency of the reference clock in the clock altering unit 158 is carried out on the basis of an altering instruction signal from the correction controller 200 (described in more detail later).

When the frequency f1 of the reference clock is altered, the rotational speed of the polygon motor 150 is controlled on the basis of the frequency of the reference clock thus altered in the PLL control circuit 156. Thereafter, when the frequency of the reference clock is returns to the original frequency f0, the rotational speed of the polygon motor 150 is returned to the original rotational speed, however, the rotational phase thereof, that is, the face position of the polygon mirror is displaced from that when the reference frequency is not altered. As described above, the phase of the polygon mirror of each color can be relatively controlled by controlling the face position (phase) of the polygon mirror of each color on the basis of the reference clock generated from the common original oscillating clock 164.

(Construction of Correction Controller and Turn-on Controller)

The correction controller 200 and the turn-on controller 202 are connected to the optical scanning device 16 (see FIG. 2). The correction controller 200 and the turn-on controller 202 are provided for each photosensitive member 14 as in the case of the optical scanning device 16.

The correction controller 200 controls the turn-on timing of LD 100, sets the step number of a skew motor 166 for correcting a displacement (skew) in the rotational direction of the photosensitive member 14, sets the phase of the polygon motor 150 instructing the driving of the polygon mirror and other corrections. The turn-on controller 202 controls the emission of the laser beam from LD 100 equipped to the optical scanning device 16.

Figure 5:
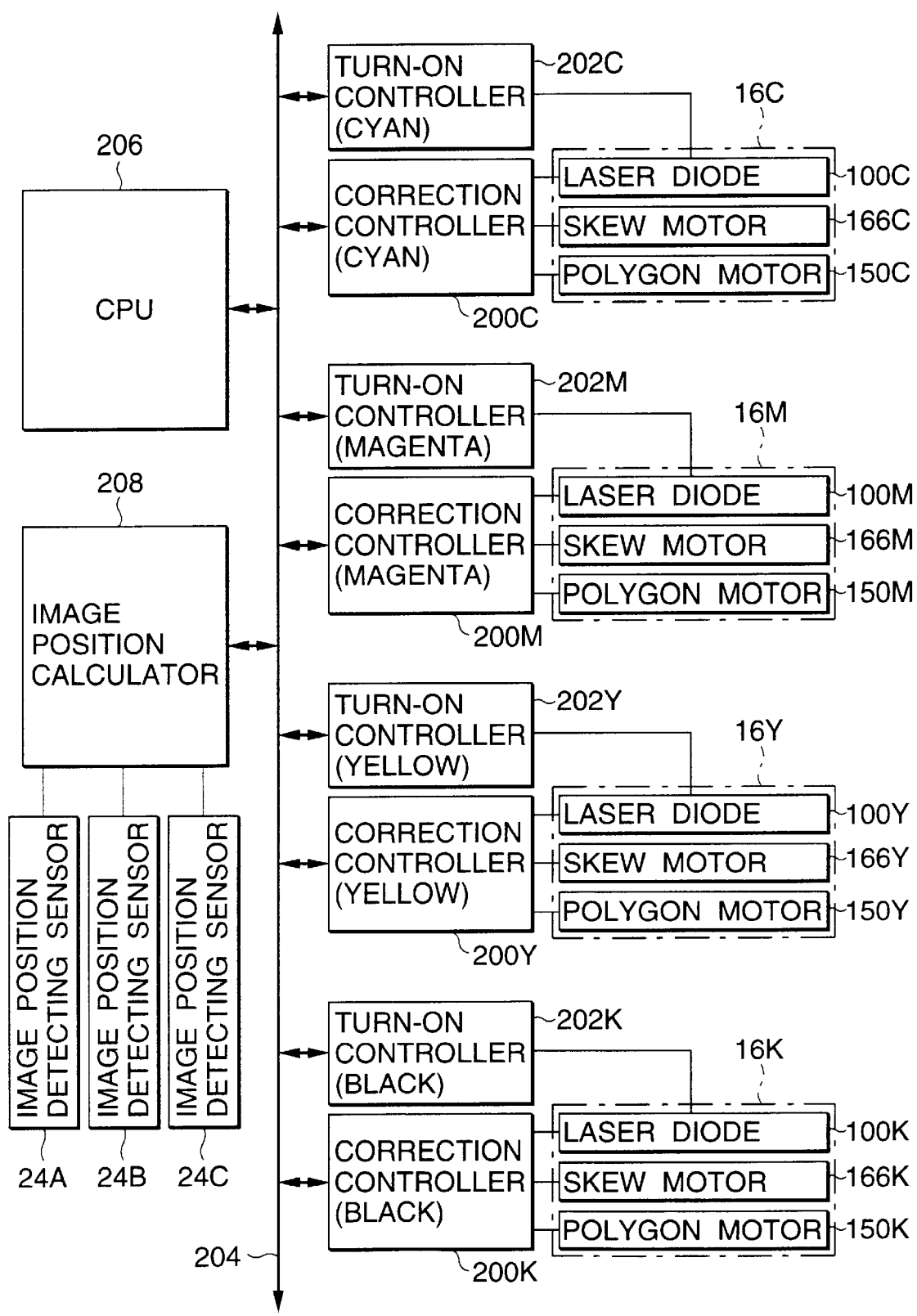
FIG. 5 is a block diagram showing the construction of the surrounding of a correction processor and a turn-on controller of the image forming apparatus.

As shown in FIG. 5, the correction controller 200 and the turn-on controller 202 are mutually connected through a bus 204 to each of CPU 206 for performing various processing in the image forming apparatus 10 and an image position operator 208 for determining the image position of each color. CPU 206 corresponds to the switch control unit, the turn-on control unit, the light amount control unit, the abnormality detecting unit and the ceasing unit of the present invention.

The image position operator 208 is connected to the image position detecting sensors 24A, 24B and 24C described above. In this embodiment, four color toner images are formed on the different photosensitive members 14C, 14M, 14Y, 14K, and then successively transferred onto the single transfer belt 12. Therefore, the image positions (registration) of the respective color toner images may be displaced due to the displacement of the securing position or the like.

Accordingly, the image position operator 208 operates the image position information on each color on the basis of the position detection result of the final toner image on the transfer belt 12 which is detected by the image position detecting sensors 24A, 24B, 24C, and CPU 206 calculates a target value for correction on the basis of the image position information of each color. The target value thus calculated is written as correction data into the correction controller 200 by CPU 206.

The correction controller 200 sets the step number of the skew motor 166 on the basis of the target value from the above equation (1) to correct the skew with respect to the rotational direction of the photosensitive member 14 so that the toner image of each color is coincident with the target value.

Further, on the basis of the target value, the correction controller 200 transmits a signal instructing the alteration of the frequency of the reference clock (the alteration from f0 to f1/the alteration from f1 to f0) to the clock altering unit 158 as described above, whereby the tone image of each color is made coincident with the target value.

Figure 6:
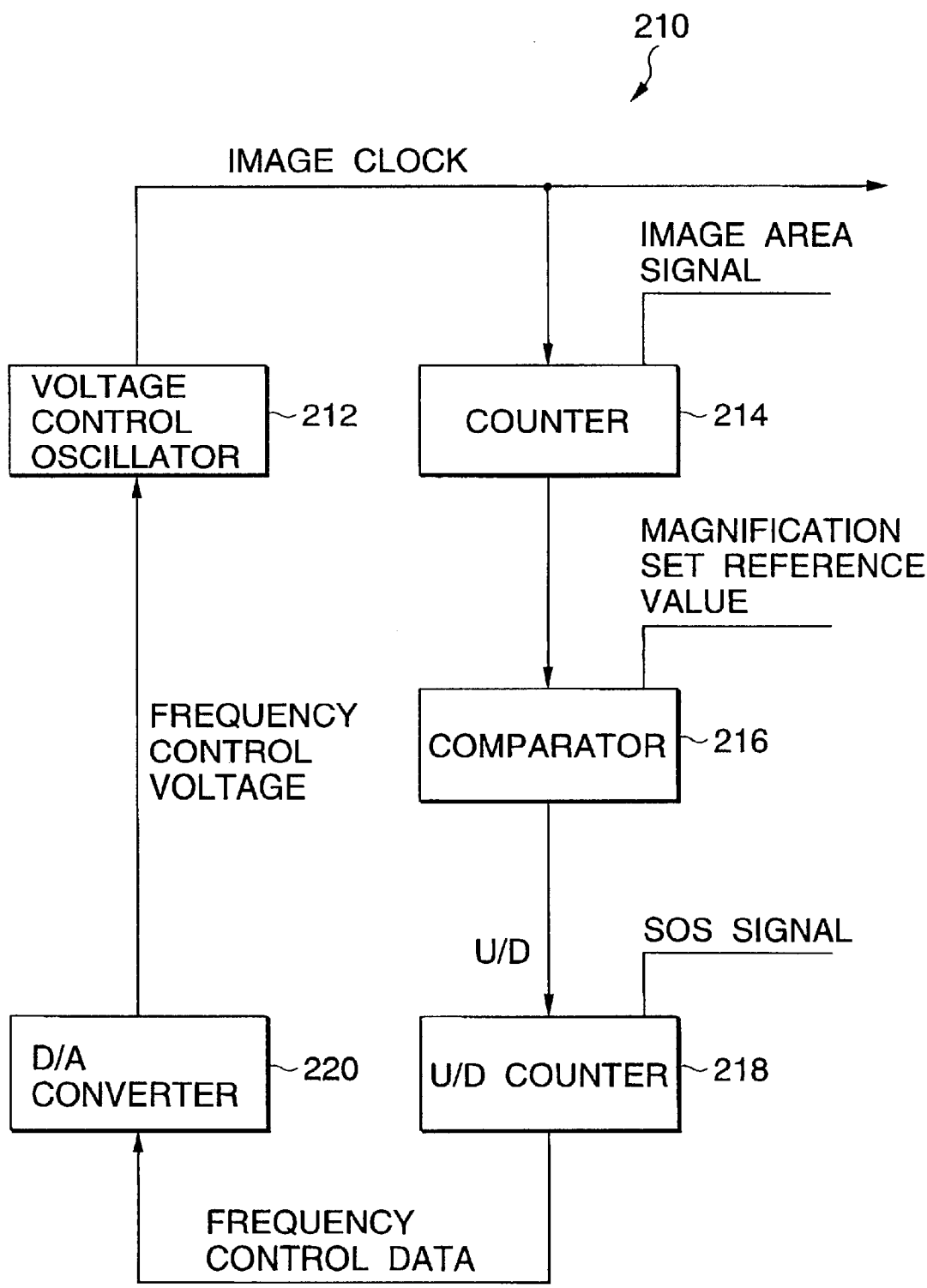
FIG. 6 is a block diagram showing an image clock control circuit.

The correction controller 200 is equipped with an image clock control circuit 210 shown in FIG. 6 to control the turn-on timing of LD 100. As shown in FIG. 6, the image clock control circuit 210 is equipped with a voltage control oscillator 212, a counter 214, a comparator 216, an up/down counter (hereinafter referred to as "U/D counter") 218 and a digital-to-analog (D/A) converter 220.

The voltage control oscillator 212 generates an image clock in synchronism with an SOS signal output from the SOS sensor 124. That is, when the laser beam is emitted from LD 100 provided to the optical scanning device 16 and irradiated to the SOS sensor 124, the SOS sensor 124 detects the pass of the laser beam therethrough, and outputs an SOS signal, thereby generating the image clock signal.

In the counter 214, the clock number of the image clocks generated in the voltage control oscillator 212 is counted over the period corresponding to the image area which is determined by a quartz oscillator or the like (at the output time of the LS signal).

The comparator 216 compares the count value of the image clock number output from the counter 214 with a magnification set reference value (corresponding to the target value described above), and it generates an up signal if the count value is smaller than the magnification set reference value or generates a down signal if the count value is larger than the magnification set reference value.

The U/D counter 218 counts up or down the output timing of each of the SOS pre-turn-on signal and the APC signal. The SOS pre-turn-on signal is a signal for controlling LD 100 to emit the laser beam just before the output timing of the SOS signal so that the SOS signal can be surely output. Further, the APC signal is a signal for instructing execution of the light amount control of the laser beam emitted from LD 100.

A count result output from the U/D counter 218 is output to the D/A converter 220. The D/A converter 220 converts a digital output value to an analog voltage, and outputs the analog voltage to the voltage control oscillator 212.

By repeating the above closed loop, the magnification in the fast scanning direction of each color toner image reaches the magnification set reference value, whereby the frequency of the image clock is controlled to the prescribed frequency determined by the target value. Accordingly, the output timing of each of the SOS pre-turn-on signal and the APC signal is set to predetermined fixed timing.

Figure 7:
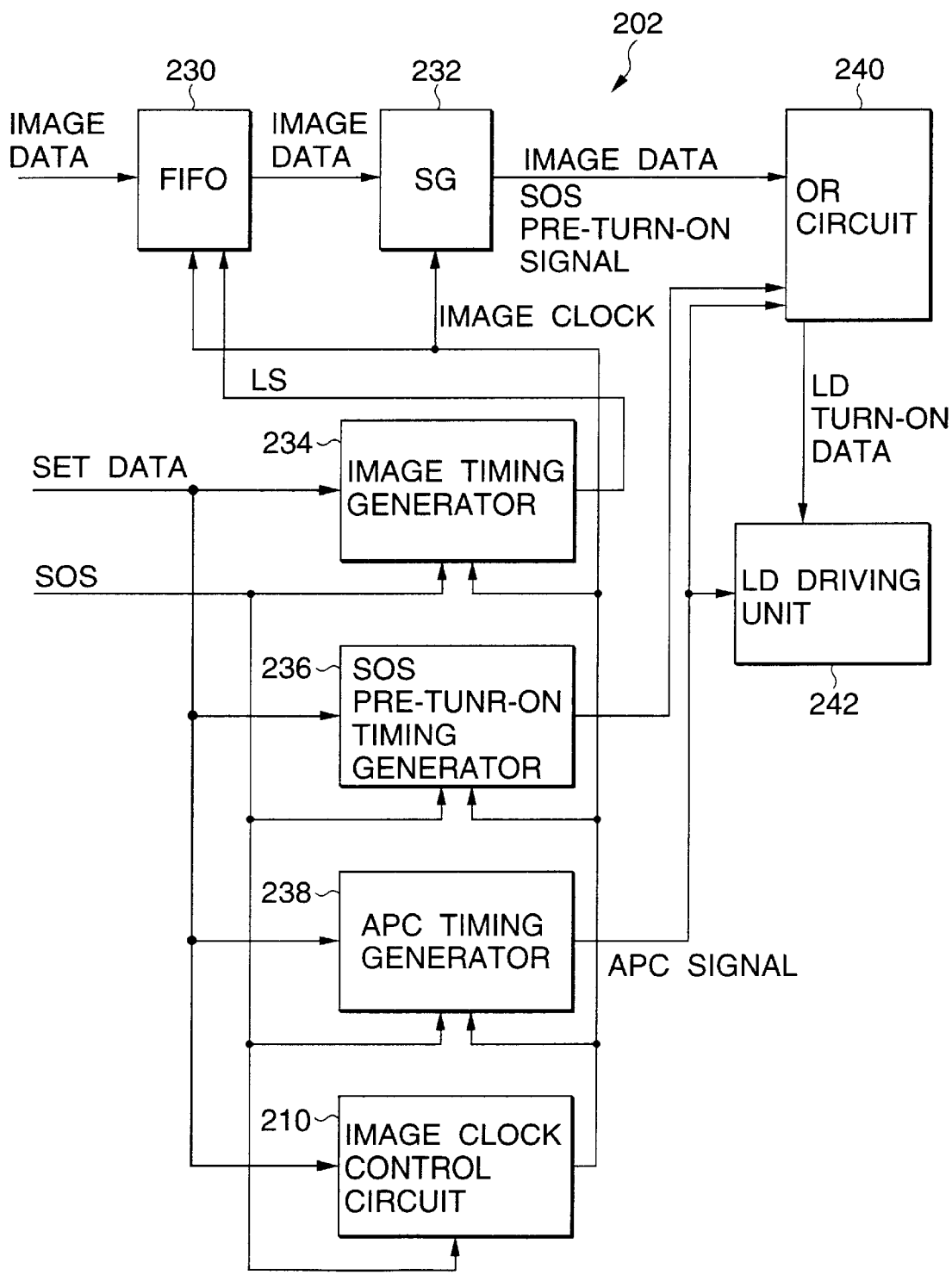
FIG. 7 is a block diagram showing the turn-on controller.

FIG. 7 shows the detailed construction of the turn-on controller 202 for controlling the turn-on of LD 100 equipped to the optical scanning device 16.

As shown in FIG. 7, the turn-on controller 202 has FIFO (first in first out) 230, a screen generator (SG) 232, an image timing generator 234, an SOS pre-turn-on timing generator 236, an APC timing generator 238, etc. The turn-on controller 202 is supplied with various set data set by CPU 206 and the SOS signal obtained by the SOS sensor 124.

The image data output from the image processor (not shown) are temporarily stored into FIFO 230 to control the output timing. The image timing generator 234 outputs to F1FO 230 an LS signal serving as a read-out allowing signal corresponding to the position of the fast scanning direction of an image which is set by the CPU 206, whereby FIFO 230 outputs the image data to SG 232 when the LS signal is input.

SG 232 is supplied with the image clock from the image clock control circuit 210 described above. In SG 232, multi-bit image data are converted to a modulation signal which is matched with the characteristic of LD 100, and then the modulation signal is output to an OR circuit 240 according to the image clock.

The SOS pre-turn-on timing generator 236 generates an SOS pre-turn-on signal on the basis of SOS pre-turn-on timing data set by CPU 206. That is, the SOS pre-turn-on signal is output after the time set by the SOS pre-turn-on timing data elapses from the output of the SOS signal. Likewise, the APC timing generator 238 generates an APC signal for executing the light amount control of the laser beam. The SOS pre-turn-on signal and the APC signal thus generated are output to the OR circuit 240.

The OR circuit 240 outputs LD turn-on data to an LD driving unit 242 when any one of the image data, the SOS pre-turn-on signal and the APC signal is input to the OR circuit 240. The LD driving unit 242 controls the turn-on operation of LD 100 on the basis of the LD turn-on data.

That is, when the image data are input, LD 100 is turned on to scan an image for the photosensitive member 14. When the SOS pre-turn-on signal is input, LD 100 is forcedly turned on just before the output timing of the SOS signal. Further, when the APC signal is input, LD 100 is forcedly turned on to execute the light amount of the laser beam. When LD having plural light emission points is used, the turn-on controller of FIG. 7 may be provided every light emission point.

(Action)

Next, the action of the present invention will be described.

The image forming apparatus 10 monitors occurrence of abnormality of the rotation of the polygon motor 150 by using the comparison clock (the FG signal/SOS signal selected by the selector 154). More specifically, when the phase difference between the reference clock and the comparison clock is above a predetermined set value, a lock signal indicating an unlock state is output from the PLL control circuit 156, and the rotation abnormality is detected on the basis of this lock signal. When the rotation abnormality is detected, the operation of the image forming apparatus 10 is stopped in order to prevent disturbance of the image due to the rotation abnormality and burning of the polygon motor due to damage of a bearing or the like of the polygon motor.

Further, in the image forming apparatus 10, when no image forming processing is carried out, the output of the FG sensor 152 (FG signal) is selected as the comparison clock by the selector 154, and the polygon motor 150 of each optical scanning device is rotated at a fixed number of revolutions by the internal control.

At this time, when an instruction of executing the image forming processing is input, a control routine shown in FIG.

8 is carried out by CPU 206 in the image forming apparatus 10 in order to shift to the state that the image forming processing can be carried out, that is, the image forming state.

In step 300, the detection of the rotation abnormality of the polygon motor 150 on the basis of the lock signal output from the PLL control circuit 156 is stopped.

In next step 302, by carrying out the setting for the initial light amount control (hereinafter referred to as "initial APC") in the turn-on controller 202, an initial APC based on the setting is started by the turn-on controller 202. In an initial state of LD 100, the applied current amount is equal to zero, and under this state no SOS signal is generated even when a laser beam is irradiated to the SOS sensor 124. Therefore, it is in the initial APC that the light amount control is continuously performed until a laser beam having a light amount enough to generate an SOS signal can be obtained.

Thereafter, the processing is on standby until a light amount enough to generate the SOS signal is obtained by the initial APC (step 304 ), and goes to a next step 306. In this embodiment, the execution time of the initial APC is set to 10 ms (milli-second), and when 10 ms elapses from the start of the initial APC , it is assumed that the light amount of the laser beam enough to generate the SOS signal is obtained, thereafter shifting to a next step 306.

In the step 306, the setting of the turn-on controller 202 is altered so as to obtain SOS pre-turn-on longer than the variation amount of the SOS period due to the rotational variation of the polygon motor 150 which is caused when the comparison clock used for the PLL control of the polygon motor 150 is switched from the FG signal to the SOS signal. That is, the SOS pre-turn-on is started earlier than the SOS detection timing by at least the variation amount.

In the turn-on controller 202, on the basis of this setting, the APC signal and the SOS pre-turn-on signal are output from the APC timing generator 238 and the SOS pre-turn-on timing generator 236 respectively, whereby the light amount control of LD 100 and the SOS pre-turn-on are executed. This state is a transit state which is set until the state is shifted to the image forming state, and it is called as "MIDDLE APC".

Figure 9:
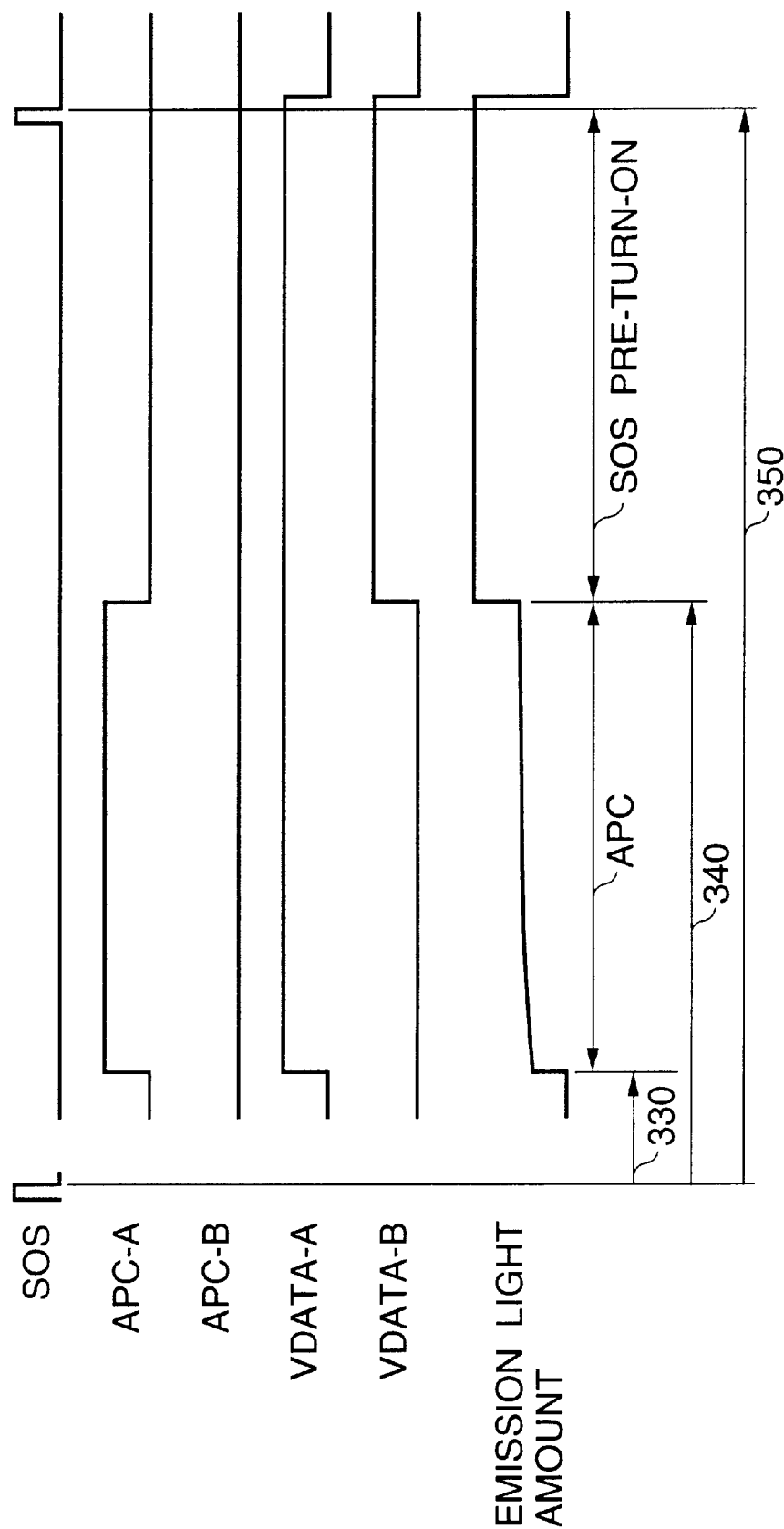
FIG. 9 is a timing chart of each signal which indicates an example of MIDDLE APC.

For example, when the rotational variation of the polygon motor occurring at the time when the comparison clock used for the PLL control of the polygon motor is switched from the FG signal to the SOS signal is equal to 2% at maximum, the turn-on controller 202 may be set so that the light amount control and the SOS pre-turn-on are carried out at the timing as shown in FIG. 9.

FIG. 9 shows an example of the setting when LD having two light emission points is used. In FIG. 9, "SOS" represents the detection timing of an SOS signal, "APC-A" represents an APC signal for instructing the execution of the light amount control of one light emission point, "APC-B" represents an APC signal for instructing the execution of the light amount control of the other light emission point, "VDATA-A" represents a turn-on signal for instructing the turn-on of one light emission point, "VDATA-B" represents a turn-on signal for instructing the turn-on of the other light emission point, and "emission light amount" represents the emission light amount from the laser diode (the total emission light amount from the two light emission points).

In FIG. 9, since a normal SOS period (when there is no rotational variation of the polygon motor) is equal to 350 $\mu$s (microseconds), the SOS period may be shortened by 7 $\mu$s (microsecond) at maximum due to the rotational variation of the polygon motor. On the other hand, by setting the SOS pre-turn-on time to 10 $\mu$s, 2.86% at maximum is allowed to the rotational variation of the polygon motor.

Thereafter, the processing is on standby until the setting of the turn-on controller 202 is altered to the setting for MIDDLE APC (step 308), and then the processing goes to step 310. In this embodiment, the time required for the alteration of the setting is set to 10 ms (milli seconds).

In step 310, the comparison clock used for the PLL control of the polygon motor is switched from the FG signal to the SOS signal. The switching operation of the comparison clock is carried out by switching the selection instructing signal FGSEL to be transmitted to the selector 154 from the H level to the L level.

A rotational variation of 2% at maximum occurs in the polygon motor due to the switching operation of the comparison clock. However, since the setting of MIDDLE APC is carried out in step 306, the omission of the SOS signal does not occurs. Further, since the detection of the rotation abnormality of the polygon motor is stopped in step 300, the operation of the image forming apparatus is not stopped even when the rotational variation of the polygon motor occurs due to the switching operation of the comparison clock.

The processing waits until the rotational variation of the polygon motor 150 due to the switching operation of the comparison clock from the FG signal to the SOS signal is converged (step 312), and then the processing goes to step 314. In this embodiment, the time required to converge the rotational variation of the polygon motor 150 is set to is (second).

Figure 13:
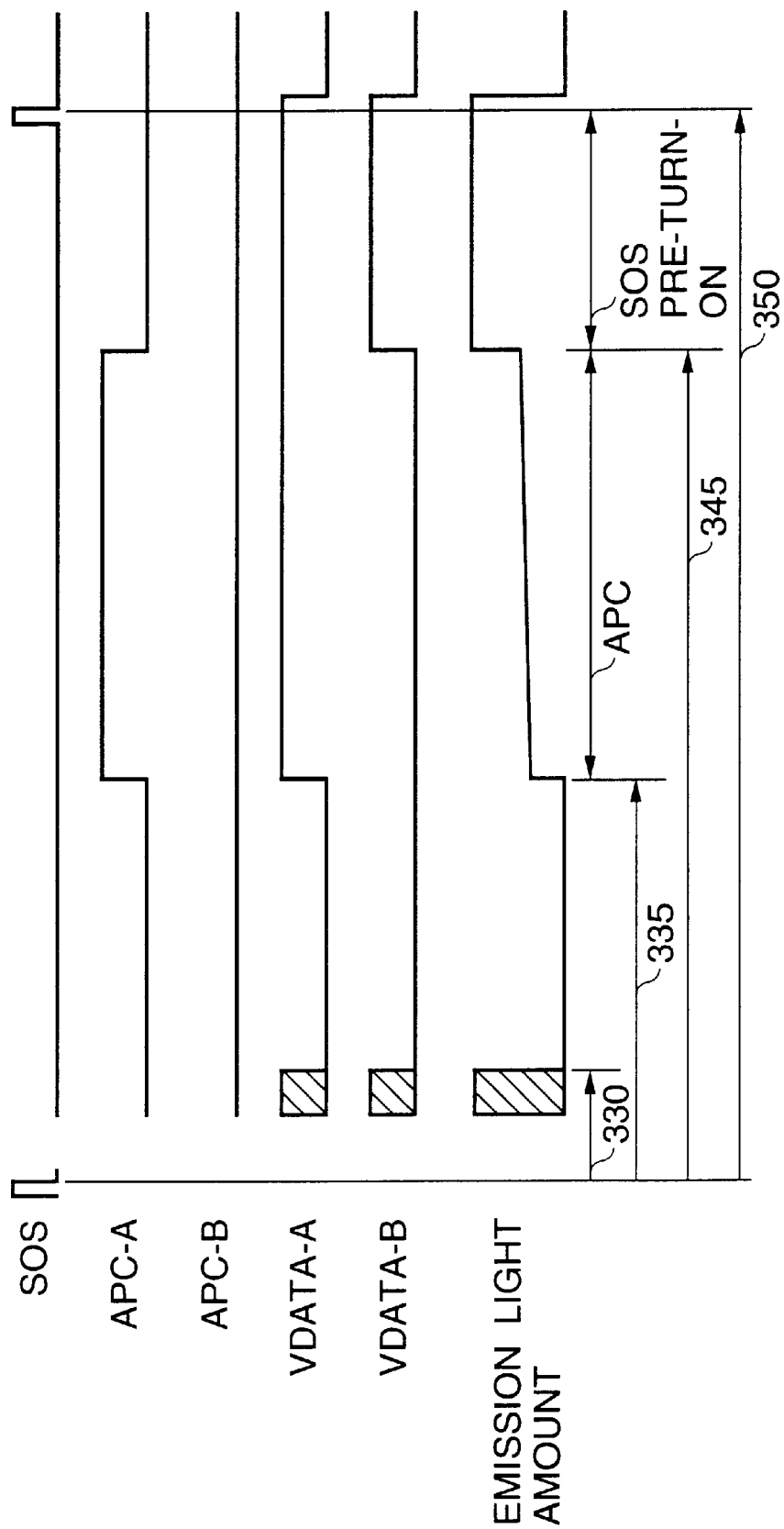
FIG. 13 is a timing chart showing an example of the output timing of each signal in a nominal state.
Figure 14:
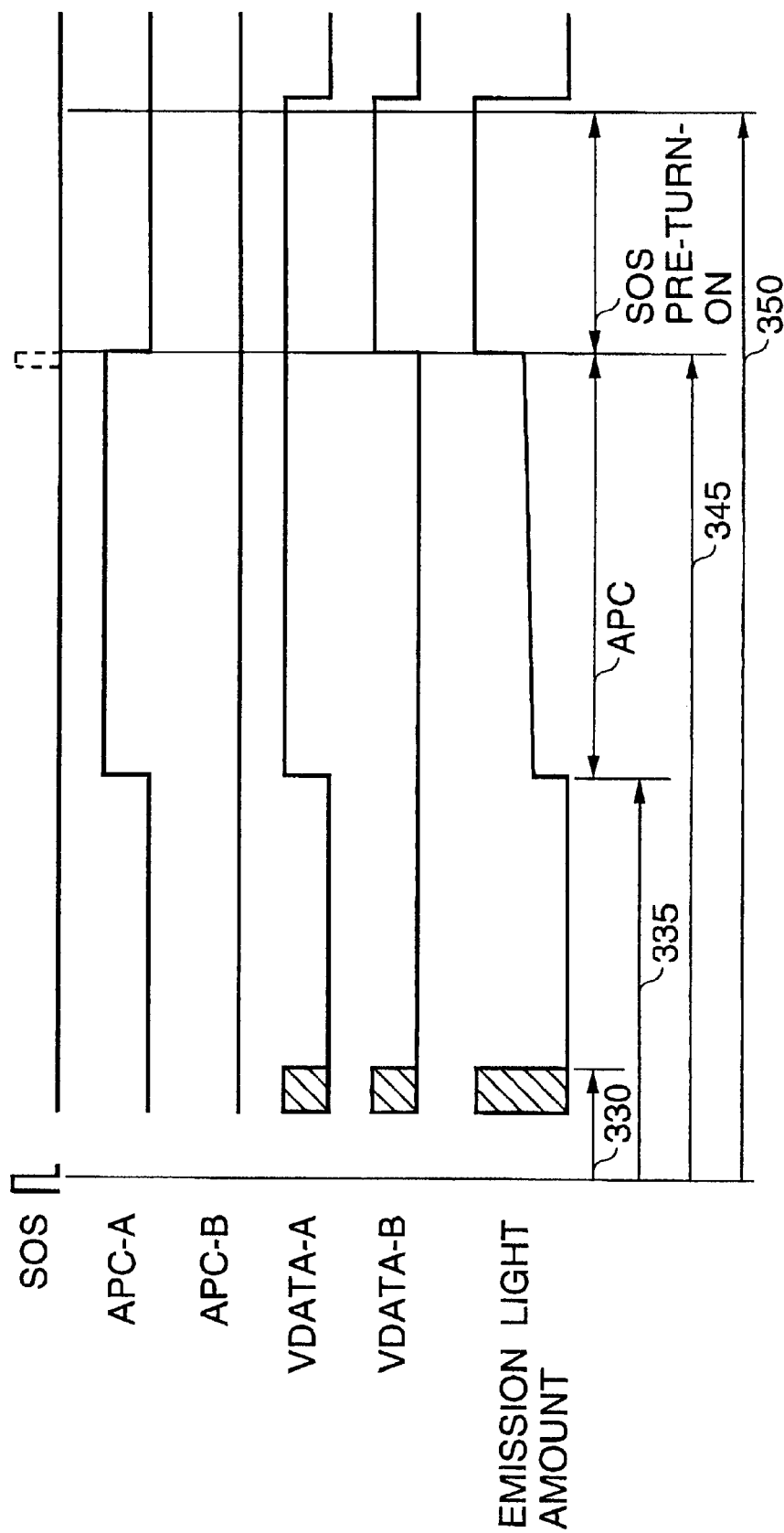
FIG. 14 is a timing chart showing an example of the output timing of each signal when the polygon motor is rotationally varied by about 1.5% under the control of the nominal state shown in FIG. 13.

In step 314 , the setting of the turn-on controller 202 is set to the normal timing (the timing at the image forming processing time). Specifically, the SOS pre-turn-on time is shortened so that the SOS pre-turn-on is out of the image forming area. Further, the turn-on for the light amount control (APC) is set so as to be out of the image forming area and before the SOS pre-turn-on. This is called as RUN MODE APC. With this setting, the light amount control and the SOS pre-turn-on are carried out at the timing shown in FIG. 13 (see Table 1), and a sufficient image area is obtained.

Here, when the magnification in the fast scanning direction and the set value of the side registration are changed and the frequency of the image clock is altered, by using the aforementioned equation (1), the timing (image clock number) of the light amount control and the SOS pre-turn-on are altered in accordance with the magnification in the fast scanning direction and the set value of the side registration. required to the light amount control and the SOS pre-turn-on can be kept to a fixed time.

Thereafter, the processing waits until the operation of the optical scanning device is stabilized (step 316), and then goes to step 318. In this embodiment, the time required to stabilize the operation of the optical scanning device is set to 1.5 s (second).

In step 318, the detection of the rotation abnormality of the polygon motor 150 on the basis of the lock signal output from the PLL control circuit 156 and the detection of abnormality in the generation interval of the SOS signal are started, and the start operation of starting the image forming processing is completed.

Figure 8:
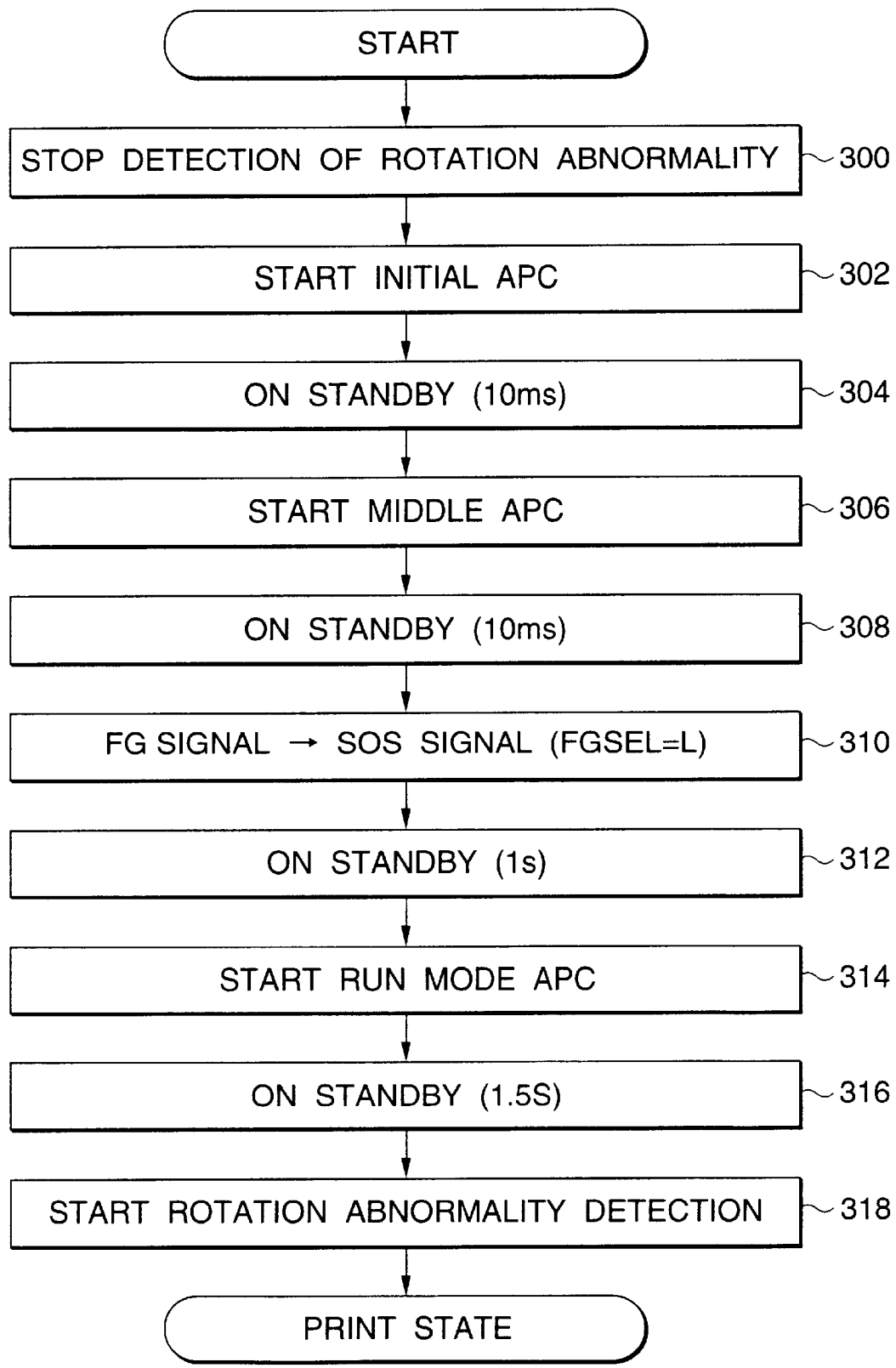
FIG. 8 is a flowchart showing a control routine executed at the time of shift to an image forming state.

Through the above operation, the image forming apparatus 10 is set to the image forming state, and the image forming processing is started. After the image forming processing is finished, the comparison clock is switched to the FG signal again to perform the PLL control, and when a next instruction of executing the image forming processing is input, the same control is repeated (see FIG. 8).

As described above, when the comparison clock used for the PLL control of the polygon motor 150 is switched from the FG signal to the SOS signal and the image forming processing is started, MIDDLE APC is carried out until the rotational variation of the polygon motor 150 due to the switching operation of the comparison clock is converged. Through MIDDLE APC, the SOS pre-turn-on is controlled to be longer than the variation amount of the SOS period due to the rotational variation of the polygon motor 150 which occurs at the switching time from the FG signal to the SOS signal.

Accordingly, even when the comparison clock is switched from the FG signal to the SOS signal, the SOS signal can be surely detected, and the runaway of the polygon motor 150 can be prevented. In other words, since the image forming processing is started after the rotational variation of the polygon motor 150 due to the switching operation of the comparison clock is converged, the image forming processing can be performed stably (the apparatus is not stopped) even when the SOS pre-turn-on time in the image forming processing is shortened to increase the effective scan rate of the optical scanning device 16 (broaden the image area within the scan permissible width).

Further, even when a monolithic type laser diode is used as the light source, a sufficient time required for the light amount control can be secured without being overlapped with the SOS detection timing.

In the above embodiment, when the image forming apparatus is shifted to the image forming state after it is started, the comparison clock is selectively switched to one of the FG signal and the SOS signal. However, the present invention is not limited to the above embodiment, and for example, the comparison clock may be automatically switched when the control of the polygon motor gets unstable.

For example, if abnormality is detected in the generation interval of the SOS signal (see step 318) under the state that the polygon motor is controlled by using the SOS signal as the comparison clock, the comparison clock may be automatically switched to the FG signal. This case will be described hereunder as a second embodiment of the present invention.

<Second Embodiment>

Figure 10:
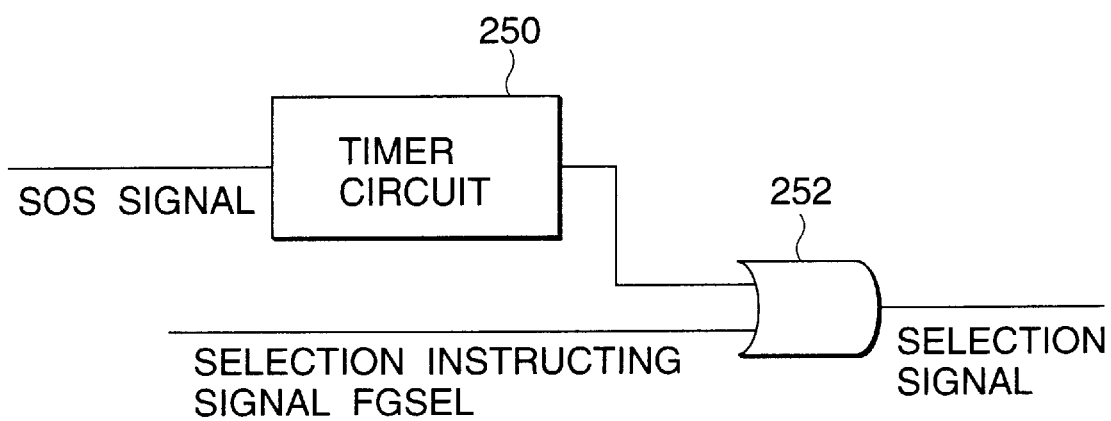
FIG. 10 is a diagram showing the construction of a circuit added to a selector according to a second embodiment of the present invention.
Figure 11:
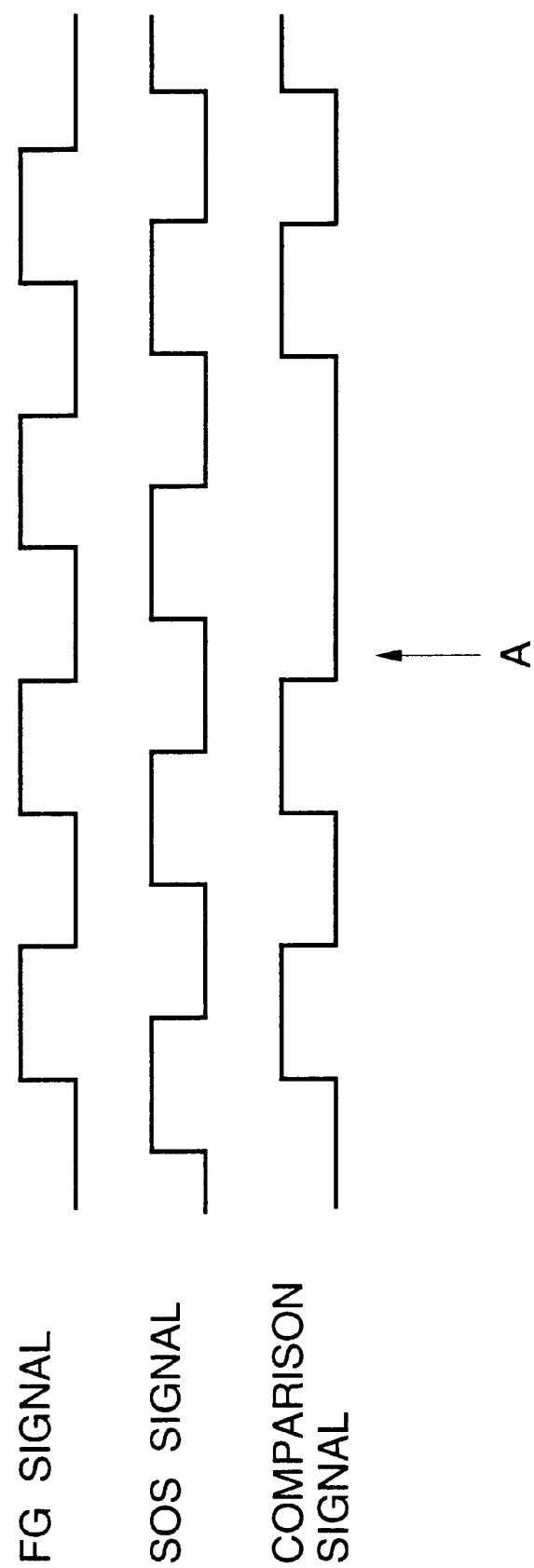
FIG. 11 is a timing chart when a comparison clock is switched from an FG signal to an SOS signal.
Figure 12:
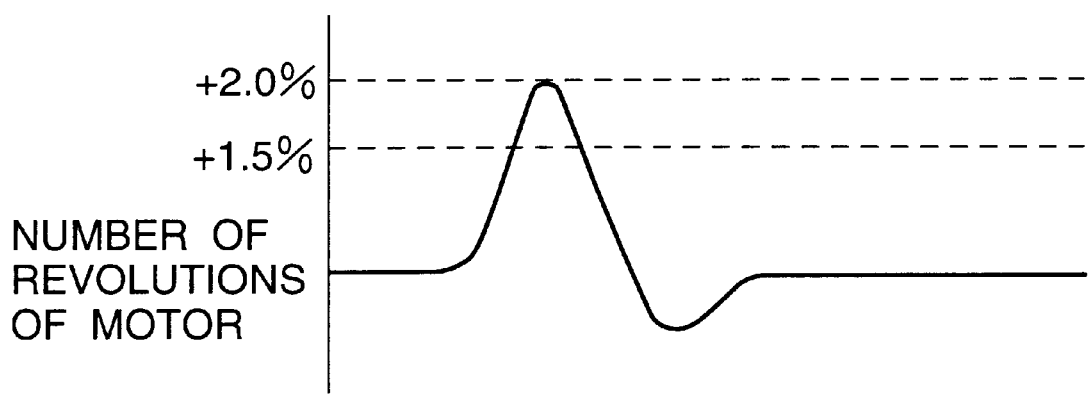
FIG. 12 is a graph showing a rotational variation of a polygon motor which occurs when the comparison clock is switched from the FG signal to the SOS signal.

A second embodiment according to the present invention will be described with reference to FIG. 10. In the second embodiment, the selector 154 is equipped with a timer circuit 250 for switching the comparison clock from the SOS signal to the FG signal.

The timer circuit 250 is constructed by a one-shot circuit such as HC 123 of a standard logic IC or the like. When the SOS signal is output at a regular period, the timer circuit 250 is retriggered at all times and outputs L level. On the other hand, when the SOS signal is generated at a period longer than the regular period, the timer circuit 250 outputs H level on the basis of a timer.

The output of the timer circuit 250 is input to a OR circuit 252 at a next stage. The selection instructing signal input from the correction controller 200 through the clock altering unit is input to the OR circuit 252. If at least one of the selection instructing signal from the correction controller 200 and the output of the timer circuit 250 is in H level, the output signal (selection signal) of the OR circuit 252 is in H level, and thus the selector 154 selects the FG signal as the comparison clock.

That is, not only on the basis of the selection instructing signal from the correction controller 200, but also when the selection signal is in L level and the polygon motor 150 is subjected to the PLL control using the SOS signal as the comparison clock, the control is switched to the PLL control using the FG signal as the comparison clock even when abnormality occurs in the generation interval of the SOS signal.

Accordingly, when the SOS signal is missing due to a noise or the like, the runaway, etc. of the polygon motor can be prevented, and also the reduction of the productivity due to stop of the image forming apparatus or the like can be prevented. When the SOS signal is stationarily generated, the selection of the comparison clock may be switched to the SOS signal. In this case, for example, the runaway of the polygon motor due to the switching operation of the comparison clock may be prevented by the same control as the first embodiment (see FIG. 8).

The same control (the switching operation of the comparison clock from the SOS signal to the FG signal) may be also carried out in order to prevent the runaway of the polygon motor at the variation time of a video clock which is generated at the rotational variation timing of the polygon motor occurring at the phase control time of the polygon motor or at the image clock altering timing of the image clock control circuit.

The above-described embodiments use the tandem type image forming apparatus which is equipped with the photosensitive member and the optical scanning device are provided every color to form a multi-color image. However, the present invention is not limited to this type. Any type image forming apparatus may be used insofar as it can form an electrostatic latent image on a photosensitive member by an optical scanning device and then form an image. For example, the present invention may be applied to an image forming apparatus which is equipped with plural photosensitive members and an optical scanning device for outputting plural laser beams to form a multi-color image (so-called spray paint type) or an image forming apparatus for forming a monochromatic image such as a white-and-black image or the like.

The above-described embodiments use a two-step control operation of setting the SOS pre-turn-on time to be longer than the variation amount of the SOS period due to the switching operation when the comparison clock is switched from the FG signal to the SOS signal and shortening the SOS pre-turn-on time after the rotational variation of the polygon motor 150 due to the switching operation is converged. However, the present invention is not limited to this control operation. It is essential to set the SOS pre-turn-on time to be longer than the variation amount of the SOS period at the switching time, and it is not necessarily required to shorten the SOS pre-turn-on time after the convergence of the rotational variation.

However, when the variation of the SOS period due to the switching operation of the comparison clock is large, it is preferable to shorten the SOS pre-turn-on time after the convergence of the rotational variation because the SOS pre-turn-on may be overlapped with an image forming area. In other words, by shortening the SOS pre-turn-on after the convergence of the rotational variation, the effective scan rate can be increased (a larger image forming area can be secured).

In the above-described embodiments, the number of revolutions of the polygon motor 150 is detected by using the FG sensor 152. However, the present invention is not limited to this sensor. Any member may be used insofar as it can detect the number of revolutions of the polygon motor. For example, the number of revolutions of the polygon motor may be detected by using a Hall element in place of the FG sensor 152 or by other substitute members.

In the above-described embodiments, the SOS signal indicating the scan start timing is obtained. However, the present invention is not limited to this style, and any signal may be used insofar as the timing every main scan can be detected. For example, instead of the SOS signal, EOS (end of scan) signal indicating the scan end timing may be obtained.

In the above-described embodiments, a monolithic type laser diode having plural light emission points is used as the light source. However, the present invention is not limited to this type of laser diode. For example, a laser diode having a single light emission point may be used, and a plane light emitting laser having plural light emission points may be used. Further, a so-called beam combining method for combining laser beams from plural laser diodes may be used.

As described above, according to the present invention, even when the rotation control of the polygon motor is switched between the internal control based on the encoder in the motor and the external control based on the horizontal synchronous signal from the outside of the motor, the stable image forming operation can be carried out. In addition, there is an excellent effect of keeping the effective scan rate high.

What is claimed is:

1. A light source turn-on controlling method used for an image forming apparatus in which a laser beam output from a light source scans an image carrier by rotating a rotational polygonal mirror to form an image, the apparatus including a number-of-revolutions detecting unit that detects the number of revolutions of a driving motor which rotates the rotational polygonal mirror, an internal control unit that rotates the driving motor at a predetermined number of revolutions on the basis of the detection result of the number-of-revolutions detecting unit, a fast scanning timing detection unit which is provided out of an image forming area in the fast scanning direction of the laser beam and detects a fast scanning timing of the laser beam, an external control unit that rotates the driving motor at a predetermined number of revolutions on the basis of the detection result by the fast scanning timing detection unit, and a switching control unit that performs a switching operation between a rotational control based on the internal control unit and a rotational control based on the external control unit, the light source turn-on controlling method comprising the step of:

starting the turn-on of the light source to make the laser beam incident on the fast scanning timing detection unit to satisfy the relationship of T1>T2 during the shift period of the switching operation from the rotational control by the internal control unit to the rotational control by the external control unit, where T1 represents the period from a start time at which turn-on of the light source is started to make the laser beam incident on the fast scanning timing detection unit to a time at which the laser beam is incident on the fast scanning timing detection unit and the fast scanning timing is detected and T2 represents the time corresponding to a variation of one fast scan time due to a rotational variation of the driving motor which is caused by the switching operation from the rotational control by the internal control unit to the rotational control by the external control unit.

2. The light source turn-on control method as claimed in claim 1, wherein after the shift to the rotational control by the external control unit, the turn-on start timing of the light source to make the laser beam incident on the fast scanning timing detection unit is varied to satisfy the relationship of T1<T3, where T3 represents the period from going out of an end portion of the image forming area until the detection of the fast scanning timing by the fast scanning timing detection unit.

3. The light source turn-on control method as claimed in claim 1, wherein the turn-on start timing of the light source to make the laser beam incident on the fast scanning timing detection unit is varied to satisfy the relationship of T1< (T3−T4), where T3 represents the period from going out of an end portion of the image forming area until the detection of the fast scanning timing by the fast scanning timing detection unit and T4 represents the period during which the light source is turned on, after the shift to the rotational control by the external control unit.

4. An image forming apparatus in which a laser beam output from a light source scans an image carrier by rotating a rotational polygonal mirror to form an image, comprising:

a number-of-revolutions detecting unit that detects the number of revolutions of a driving motor which rotates the rotational polygonal mirror;

an internal control unit that rotates the driving motor at a predetermined number of revolutions on the basis of the detection result of the number-of-revolutions detecting unit;

a fast scanning timing detection unit which is provided out of an image forming area in the fast scanning direction of the laser beam and detects a fast scanning timing of the laser beam;

an external control unit that rotates the driving motor at a predetermined number of revolutions on the basis of the detection result by the fast scanning timing detection unit;

a switching control unit that performs a switching operation between a rotational control by the internal control unit and a rotational control by the external control unit; and a turn-on control unit that turns on the light source earlier than a timing of incidence of the laser beam on the fast scanning timing detection unit by at least the time corresponding to a variation of one fast scanning time due to the rotational variation of the driving motor caused by the switching operation in a shift period during which the rotational control by the internal control unit is switched to the rotational control by the external control unit by the switching control unit.

5. The light source turn-on control apparatus as claimed in claim 4, wherein the turn-on control unit turns on the light source earlier than the timing of incidence of the laser beam on the fast scanning timing detection unit by at least the time corresponding to the variation amount of one fast scanning time due to the rotational variation of the driving motor which is caused by the switching operation.

6. The light source turn-on control apparatus as claimed in claim 4, further comprising a light amount control unit that controls the light amount of the laser beam output from the light source, wherein after the shift to the rotational control by the external control unit, the turn-on control unit turns on the light source out of the image forming area and before the irradiation position of the laser beam reaches the fast scanning timing detection unit, and for the light amount control by the light amount control unit, the turn-on control unit turns on the light source out of the image forming area and during a period which is different from the turn-on period started before the irradiation position of the laser beam reaches the fast scanning timing detection unit.

7. The light source turn-on control apparatus as claimed in claim 6, wherein the light source has plural light emission points, the turn-on control unit independently turns on each of the plural light emission points, and the light amount control unit controls the light amount of the laser beam output from each light emission point.

8. The light source turn-on control apparatus as claimed in claim 4, further comprising an abnormality detecting unit that detects rotational abnormality of the driving motor on the basis of the detection result of the number of revolutions detecting unit or the fast scanning timing detecting unit, and a ceasing unit that ceases the detection of the rotation abnormality of the driving motor by the abnormality detecting unit during the period from the time at which the rotational control by the internal control unit is switched to the rotational control by the external control unit until the time at which the number of revolutions of the driving motor falls within a predetermined range.

9. The light source turn-on control apparatus as claimed in claim 8, wherein when rotation abnormality of the driving motor is detected by the abnormality detecting unit under the rotational control by the external control unit, the rotational control by the external control unit is switched to the rotational control by the internal control unit.

* * * * *